(12) United States Patent
Hiraguchi

(10) Patent No.: US 7,322,540 B2
(45) Date of Patent: Jan. 29, 2008

(54) RECORDING TAPE CARTRIDGE

(75) Inventor: Kazuo Hiraguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 148 days.

(21) Appl. No.: 11/354,041

(22) Filed: Feb. 15, 2006

(65) Prior Publication Data

US 2006/0231659 A1  Oct. 19, 2006

(30) Foreign Application Priority Data

Mar. 25, 2005  (JP) ............... 2005-090018

(51) Int. Cl.
*G03B 23/02* (2006.01)
(52) U.S. Cl. ............... 242/338.1; 242/348; 360/132
(58) Field of Classification Search .......... 242/338, 242/338.1, 343, 343.1, 343.2, 348, 348.2, 242/345.2; 360/132
See application file for complete search history.

(56) References Cited

U.S. PATENT DOCUMENTS

| | | | | |
|---|---|---|---|---|
| 5,004,180 A * | 4/1991 | Okamura et al. | ........ | 242/338.1 |
| 6,318,657 B1 * | 11/2001 | Nayak | ........ | 242/338.1 |
| 6,751,059 B2 * | 6/2004 | Morita et al. | ........ | 360/132 |
| 6,913,217 B2 * | 7/2005 | Ishihara | ........ | 242/338.1 |
| 7,040,564 B1 * | 5/2006 | Veno et al. | ........ | 242/338.1 |
| 2005/0051654 A1 * | 3/2005 | Hiraguchi | ........ | 242/338.1 |
| 2006/0231659 A1 * | 10/2006 | Hiraguchi | ........ | 242/338.1 |

* cited by examiner

*Primary Examiner*—William A Rivera
(74) *Attorney, Agent, or Firm*—Margaret A. Burke; Sheldon J. Moss

(57) ABSTRACT

In a recording tape cartridge, a compression coil spring urges a reel downward via a brake member. Due to the biasing force of the spring, a gear of the brake member securely meshes with a gear inside a reel hub preventing the reel's inadvertent rotation. The biasing force urges lock members outward in a radial direction from the center of a mount or the reel. Engagement portions of the lock members engage with an upper edge of the hub. The outer side surfaces of the engagement portions press against the inner peripheral surface of the hub, and ends of the engagement portions at a further outer side than the body portions intervene between the upper surface of an upper flange and the inner surface of a top plate to prevent rotation of the reel and to control movement of the reel in either a radial or an axial direction.

19 Claims, 23 Drawing Sheets

RECORDING TAPE CARTRIDGE

CROSS-REFERENCE TO RELATED APPLICATION

This application claims priority under 35 USC 119 from Japanese Patent Application No. 2005-090018, the disclosure of which is incorporated by reference herein.

BACKGROUND OF THE INVENTION

1. Field of the Invention

The present invention relates to a recording tape cartridge in which a single reel, on which is wound a recording tape such as a magnetic tape mainly used as a recording and playback medium for a computer or the like, is accommodated in a case.

2. Description of the Related Art

A recording tape cartridge, in which a recording tape such as a magnetic tape used as a recording and playback medium for a computer or the like is wound on a reel, and the reel is rotatably accommodated in a case formed from a plastic material, is conventionally known. The recording tape cartridge is arranged such that when in use (when loaded into a drive device), the reel is rotatable in the case, while when not in use (when not loaded into a drive device), the reel is locked so as to be non-rotatable in the case.

More specifically, the recording tape cartridge is provided with braking means for preventing the reel from being rotated within the case when the cartridge is not in use. The braking means may be constructed such that, for example, a brake member which is non-rotatable with respect to the case can be engaged with the reel.

As shown in FIG. 19, for example, a brake member 200 is configured in the form of a disk which is accommodated so as to be vertically movable within a bottomed cylindrical shape reel hub 204 of a reel 202. A pair of engagement projections 206 which are each substantially U-shaped as seen in plan view are provided upright on the upper surface of the brake member 200. A pair of rotation regulating ribs 210 suspended from the inner surface of an upper casing 208 are inserted inside the engagement projections 206, making the brake member 200 non-rotatable with respect to the case 212.

Further, the brake member 200 is normally biased toward a bottom wall 216 of the reel hub 204 with the aid of a biasing member such as compression coil spring 214, so that an annular brake gear 218 formed in the lower surface of the brake member 200 is meshed with an annular engagement gear 220 formed in the upper surface of the bottom wall 216 of the reel hub 204. In this manner, the reel 202 is prevented from inadvertent rotation.

Still further, a substantially cylindrical operation projection 222, which is provided so as to protrude at an axial center portion of the brake member 200, is inserted into a through hole 216A formed in an axial center portion of the bottom wall 216 of the reel hub 204, and faces a gear opening 226 formed at a substantially center portion of a lower casing 224. When making the reel 202 rotatable, the operation projection 222 (brake member 200) is pushed upward, and as a result the brake gear 218 is disengaged from the engagement gear 220 (see, for example, U.S. Pat. No. 6,452,747).

However, with the above-described arrangement, when the recording tape cartridge is not in use, since the reel 202 is movable upward (movable in an axial direction of the reel 202) against a biasing force of the biasing member such as compression coil spring 214, it has happened that when the bottom wall 216 of the reel hub 204 is moved upward because of the recording tape cartridge being impacted due to being dropped or the like, the brake member 200 becomes tilted and jammed at the edge of the through hole 216A while remaining in a tilted orientation, as shown in the drawing.

If the recording tape cartridge is loaded into a drive device in such a condition, the problem exists that either recording/playback can simply not be performed or, moreover, that the recording tape cartridge is damaged or the drive device malfunctions. A further problem is that since the reel becomes rotatable when not in use, the recording tape tends to become wrinkled or is torn.

SUMMARY OF THE INVENTION

The present invention, which is a recording tape cartridge that controls the movement of a brake member when the reel is in a non-rotatable state and, at the same time, controls the movement of the reel, is required in view of the above circumstances.

A first aspect of the present invention provides a recording tape cartridge including an engagement portion formed at a lower wall of a hub of a reel rotatably accommodated within a case around which a recording tape is wound; a brake member facing the engagement portion and provided so as to be movable along an axial direction of the hub, which engages with the engagement portion and controls rotation of the reel, releasing the engagement portion from an engaged state to allow rotation of the reel; a parts mounting portion formed at a central portion of the case and positioned further at an inner side than the hub; a lock member mounted at the parts mounting portion so as to be movable in a radial direction of the reel, which intervenes between the reel and the case and controls movement of the reel in a radial direction and an axial direction, and which is pushed by the brake member to disengage from the reel and allow movement of the reel; and a biasing device that urges the lock member in a radial direction of the reel, wherein the brake member and the lock member respectively have inclines $S_1$, $S_2$ with mutually different angles, and the incline $S_1$ of the brake member and the incline $S_2$ of the lock member contact each other.

In the first aspect of the present invention, a parts mounting portion is provided at a central portion of the case, and a lock member is mounted at the parts mounting portion so as to be movable in a radial direction of the reel. The lock member is urged in a radial direction of the reel by biasing device and as well as intervening between the reel and the case to control movement of the reel in a radial direction and an axial direction (a locked state), is pushed by the brake member and disengages from the reel to allow movement of the reel (an unlocked state).

In other words, when the recording tape cartridge is not in use, since the brake member and the engagement portion are in an engaged state, providing a lock member that controls movement of the reel in a radial direction and an axial direction in this state means that there is no movement of the reel when the recording tape cartridge is not in use.

Incidentally, the brake member and the lock member respectively have inclines $S_1$, $S_2$ with mutually different angles, and the incline $S_1$ of the brake member and the incline $S_2$ of the lock member contact each other. Since the inclines $S_1$, $S_2$ provided respectively at the brake member and the lock member have mutually different angles, the respective surfaces of the inclines $S_1$, $S_2$ do not mutually contact with surface-to-surface contact; rather, they contact via line contact or point contact.

In other words, when compared to a case when the inclines $S_1$, $S_2$ of the brake member and the lock member mutually contact with surface-to-surface contact, the area of contact between the brake member and the lock member is small and abrasion due to sliding of the lock member can be reduced. For this reason, increases in resistance to sliding due to abrasion can be avoided and increases in the releasing force required to release the reel from a state of non-use can be prevented.

A second aspect of the invention provides a recording tape cartridge including an engagement portion formed at a lower wall of a hub of a reel rotatably accommodated within a case around which a recording tape is wound; a brake member facing the engagement portion and provided so as to be movable along an axial direction of the hub, which engages with the engagement portion and controls rotation of the reel, releasing the engagement portion from an engaged state to allow rotation of the reel; a parts mounting portion formed at a central portion of the case and positioned further at an inner side than the hub; a lock member mounted at the parts mounting portion so as to be movable in a radial direction of the reel, which intervenes between the reel and the case and controls movement of the reel in a radial direction and an axial direction, and which is pushed by the brake member to disengage from the reel and allow movement of the reel; and a biasing device that urges the lock member in a radial direction of the reel, wherein the brake member and the lock member respectively have inclines $S_1$, $S_2$ with mutually different angles, and when the lock member moves, an end portion of one of the inclines $S_1$, $S_2$ contacts the other of the inclines $S_1$, $S_2$ and an end portion thereof.

In the second aspect of the present invention, when the lock member moves, an end portion of one of the inclines $S_1$, $S_2$ formed at the brake member and the lock member contacts the other of the inclines $S_1$, $S_2$ and an end portion thereof. Here, the end portion of the incline refers to a corner portion (including an R portion) positioned where the incline intersects a side or the like.

For example, when the inclines $S_1$, $S_2$ are the same angle, the incline $S_1$ and the incline $S_2$ mutually contact with surface-to-surface contact, and together with the movement of the lock member the area of surface-to-surface contact gradually grows smaller such that immediately prior to the lock member slipping down from the brake member the end portion of the incline $S_1$ and the end portion of the incline $S_2$ contact each other. For this reason, from when the lock member begins to move until immediately prior to the lock member slipping down from the brake member, fluctuations occur in the resistance to sliding of the lock member.

However, in the present invention, when, for example, the end portion of the incline of the lock member contacts the incline of the brake member, the position of contact of the end portion of the incline of the lock member moves together with movement of the lock member and when it reaches the end portion of the incline of the brake member, the incline of the lock member then contacts the end portion of the incline of the brake member, and after the other/second? end portion of the incline of the lock member has reached the end portion of the incline of the brake member, the lock member slips down from the brake member.

In other words, fluctuations in the resistance to sliding of the lock member from when the lock member begins to move until immediately prior to the lock member slipping down from the brake member are minimized by changing the position of contact between the lock member and the brake member by means of the movement of the lock member.

DETAILED DESCRIPTION OF THE INVENTION

Figure 1A:
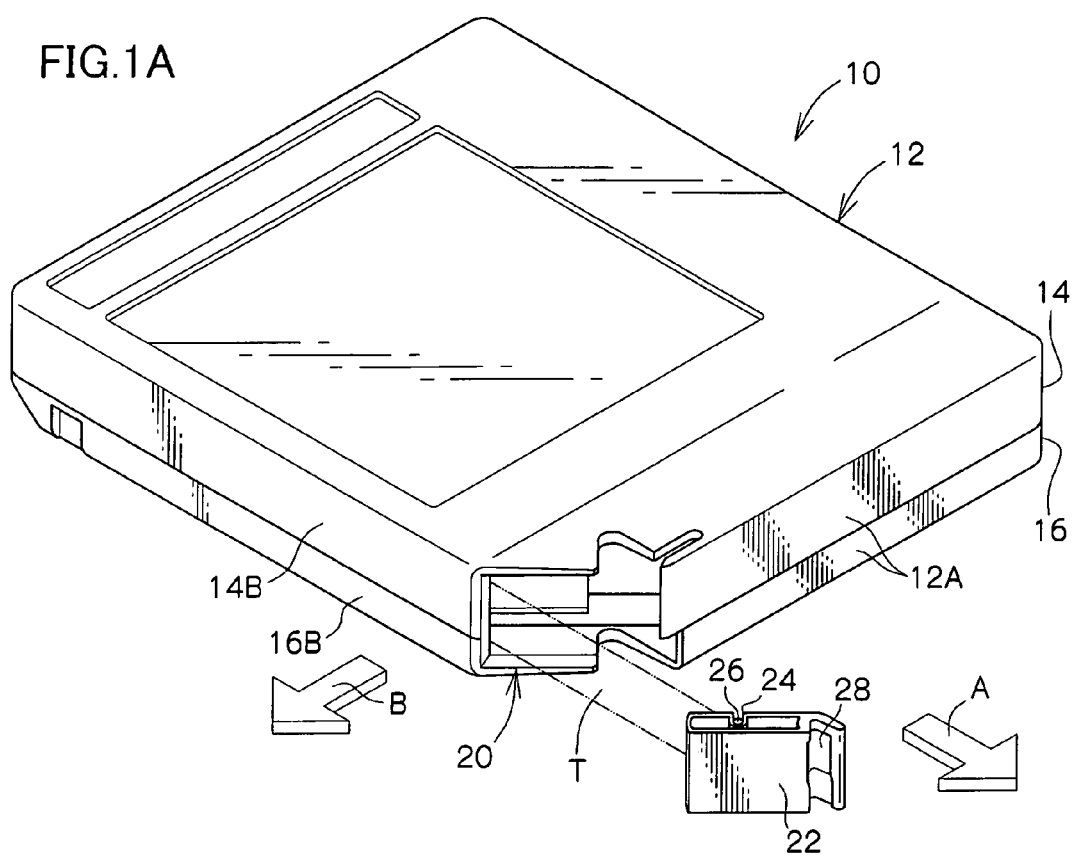
FIG. 1A is a schematic perspective view of a recording tape cartridge viewed from above.
Figure 1B:
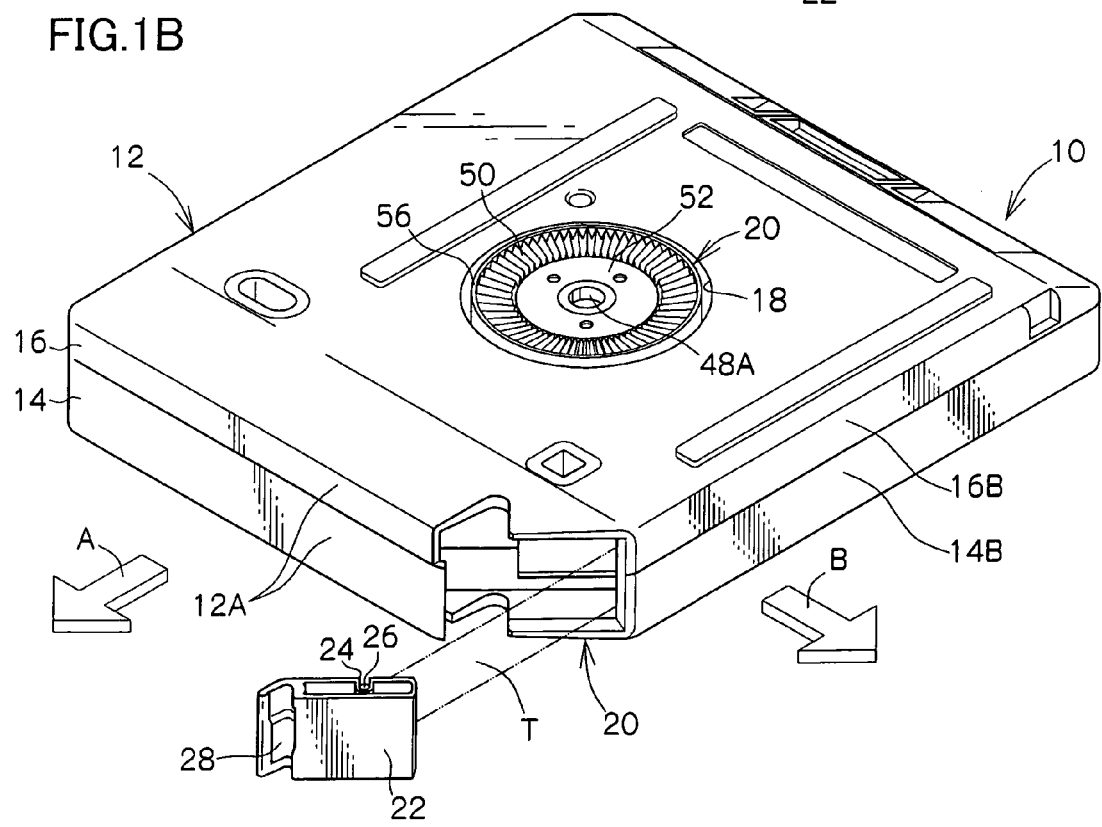
FIG. 1B is a schematic perspective view of a recording tape cartridge viewed from below.

In the following, embodiments of the present invention will be explained in detail based on the examples shown in the drawings. Further, the reel according to the present invention is applicable to a recording tape cartridge 10. Accordingly, for convenience of explanation, the direction of loading the recording tape cartridge 10 into a drive device is taken as the forward direction and shown by Arrow A. Arrow B, which is orthogonal to Arrow A, is taken as the right-hand direction.

Firstly, the overall structure of the recording tape cartridge 10 will be explained. As shown in FIGS. 1 to 4, the recording tape cartridge 10 has a substantially rectangular box-shaped case 12. The case 12 is formed by joining a plastic upper casing 14 with a plastic lower casing 16 by ultrasonic welding, screw fastening, or the like, such that respective peripheral walls 14B and 16B of the upper casing 14 and the lower casing 16 are mutually abutted.

A reel 40 is singly accommodated within the case 12. A recording tape T, which is a magnetic tape or the like used as an information recording/playback medium, is wound on the reel 40. Further, an opening 20 is formed at the front right-hand corner of the case 12. The opening 20 is for extracting the recording tape T wound on the reel 40 from the case 12.

A leader block 22 is attached to a distal end portion of the recording tape T. That is, an elastic pin 26 is inserted into a concave portion 24 of the leader block 22 such that it pinches the distal end of the recording tape T therein. When the recording tape cartridge 10 is not in use, the leader block 22 is engaged with a peripheral edge portion of the opening 20 and occludes the opening 20.

Further, when the recording tape cartridge 10 is in use, an extraction member provided at the drive device side (not shown) engages with a coupling portion 28 formed at the distal end of the leader block 22 and the leader block 22 is pulled out from the opening 20. In addition, the object attached to the distal end portion of the recording tape T is not limited to being the leader block 22 and, while not shown in the figures, may also be a leader tape, a leader pin, or the like (not shown), with a rotating object provided to occlude the opening 20.

The reel 40 is formed from a resin material and is formed of a reel hub 42 having a bottomed cylindrical shape, an upper flange 44 integrally provided on and extending from an upper end portion of the reel hub 42, and a lower flange 46 attached to a lower end portion of the reel hub 42 by welding or the like. Accordingly, the reel hub 42 and the lower flange 46 are formed using compatible resin materials and thus can be readily welded together by means of ultrasonic waves or the like.

The gap between the upper and lower flanges 44 and 46 is defined so as to be substantially equal to the width of the recording tape T, so that the width-wise position of the recording tape T wound on the reel hub 42 is controlled.

Figure 2:
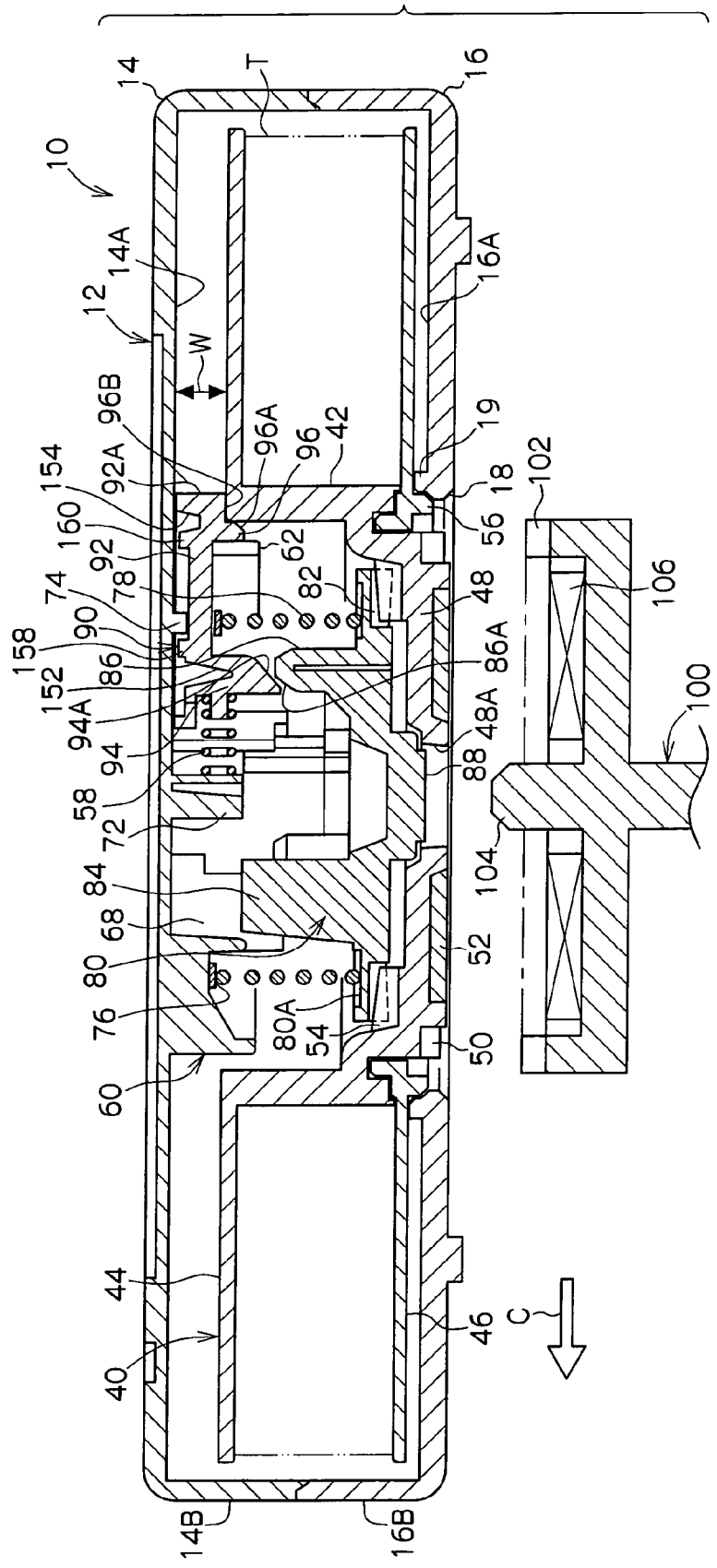
FIG. 2 is a schematic sectional side view of a recording tape cartridge before a rotation shaft is raised.
Figure 3:
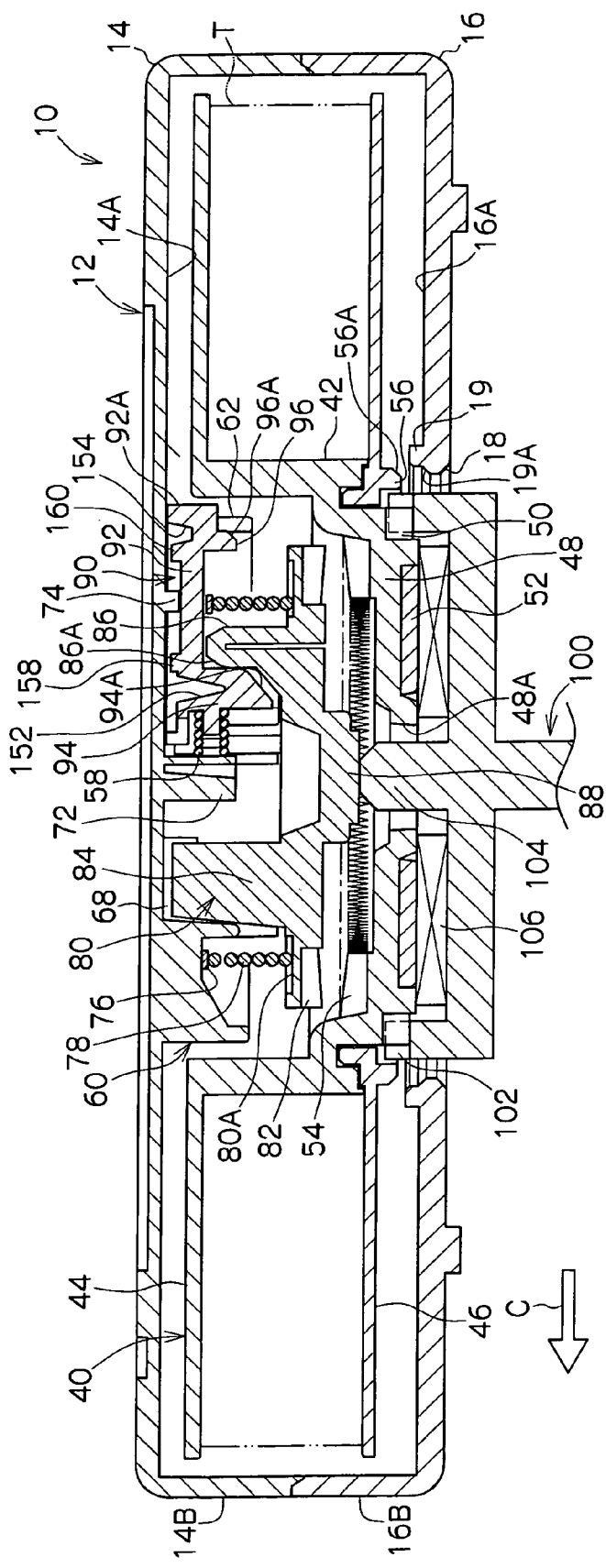
FIG. 3 is a schematic sectional side view of a recording tape cartridge after a rotation shaft is raised.

Further, as shown in FIGS. 2 and 3, the reel hub 42 is provided, on the lower flange 46 side, with a bottom wall 48 having a through hole 48A formed at an axial center portion thereof. A reel gear 50 is formed in an annular shape on the lower surface side of the bottom wall 48. In response to the reel 40 being pressed against the lower casing 16 due to a biasing force of a compression coil spring 78, the reel gear 50 is exposed through a circular gear opening 18 formed at a substantial center of the lower casing 16 and meshes with a drive gear 102 provided on a rotary shaft 100 of the drive device, thereby transmitting a rotary force to the reel 40.

An annular rib 19 is provided so as to stand upright (standing toward the inside of the case 12) at a peripheral edge of the gear opening 18, and a tapered surface 19A is formed at an inner peripheral surface thereof (the gear opening 18 side peripheral surface). An annular rib 56 is provided so as to stand in a downward direction at a lower surface of the reel 40 (lower flange 46) and at an outer side in a radial direction of the reel gear 50, and a tapered surface 56A is formed at an outer peripheral surface thereof. Accordingly, when the recording tape cartridge is not in use, it is structured so that the tapered surface 56A of the annular rib 56 surface contacts the tapered surface 19A of the annular rib 19 from above, and the reel 40 is positioned and supported by the lower casing 16.

An annular reel plate 52 formed from a magnetic material is integrally fixed at an inner side in a radial direction of the reel gear 50 using an insert molding technique or the like. In a state where the drive gear 102 and reel gear 50 are completely meshed with each other, the reel plate 52 is attracted by a magnetic force of an annular magnet 106 provided between the drive gear 102 and a release projection 104 which will be described below. This prevents an off-center shift (an axial shift) between the reel 40 and the rotary shaft 100 while at the same time making it possible to maintain the meshed state of the reel gear 50 with the drive gear 102. With such a structure, as the rotary shaft 100 rotates about its axis, the reel 40 is rotated therewith within the case 12.

On the upper surface side of the bottom wall 48 of the reel hub 42, an engagement gear 54 is annularly formed such that it can be meshed with a brake gear 82 of a brake member 80. The brake member 80 is formed in a shape of a disk and accommodated within the reel hub 42 so as to be movable vertically (movable in an axial direction of the reel 40), with the brake gear 82 being provided annularly at an outer peripheral portion of a lower surface thereof.

Further, on an upper surface of the brake member 80 are provided upright, with equal spacing and in an alternating pattern, a plurality of (three in this embodiment) plate-like guide portions 84 which are inserted between guide wall portions 68 (described later) of the upper casing 14 and a plurality of (three in this embodiment) substantially rectangular column-shaped engagement projections 86 which are engaged with cam portions 94 of an equal number (three) of lock members 90.

A tapered surface 86A (incline $S_1$) is formed at an inner side in a radial direction of the engagement projections 86 at an incline of 30 to 60° to an axial line of the reel hub 42, and an R portion 85 (see FIG. 14A) is formed at a lower end portion of the tapered surface 86A (a corner portion on a side of slipping down of the lock member 90). The tapered surface 86A can contact with (described below) a tapered surface 94A (incline $S_2$) formed at the cam portions 94 of the lock members 90.

Further, on an upper surface of the brake member 80, at an outer side of the guide portions 84 and engagement projections 86, a flat surface 80A is formed annularly which is contacted with a lower end of the compression coil spring 78, which serves as a biasing member, when the recording tape cartridge 10 (the case 12) is assembled.

Furthermore, a substantially column-shaped operation projection 88 is projectingly provided at a center portion of a lower surface of the brake member 80, which can be inserted through the through hole 48A and can be contacted with the release projection 104 which is projectingly provided at an axial center portion of the rotary shaft 100 of the drive device (see FIGS. 2 and 3).

As shown in the drawings, the operation projection 88 is provided to project to a height such that the operation projection 88 does not extend downward out of the through hole 48A (the bottom wall 48) (a height such that the operation projection 88 is disposed within the through hole 48A), thereby preventing the brake member 80 from being moved upward inadvertently.

Figure 4:
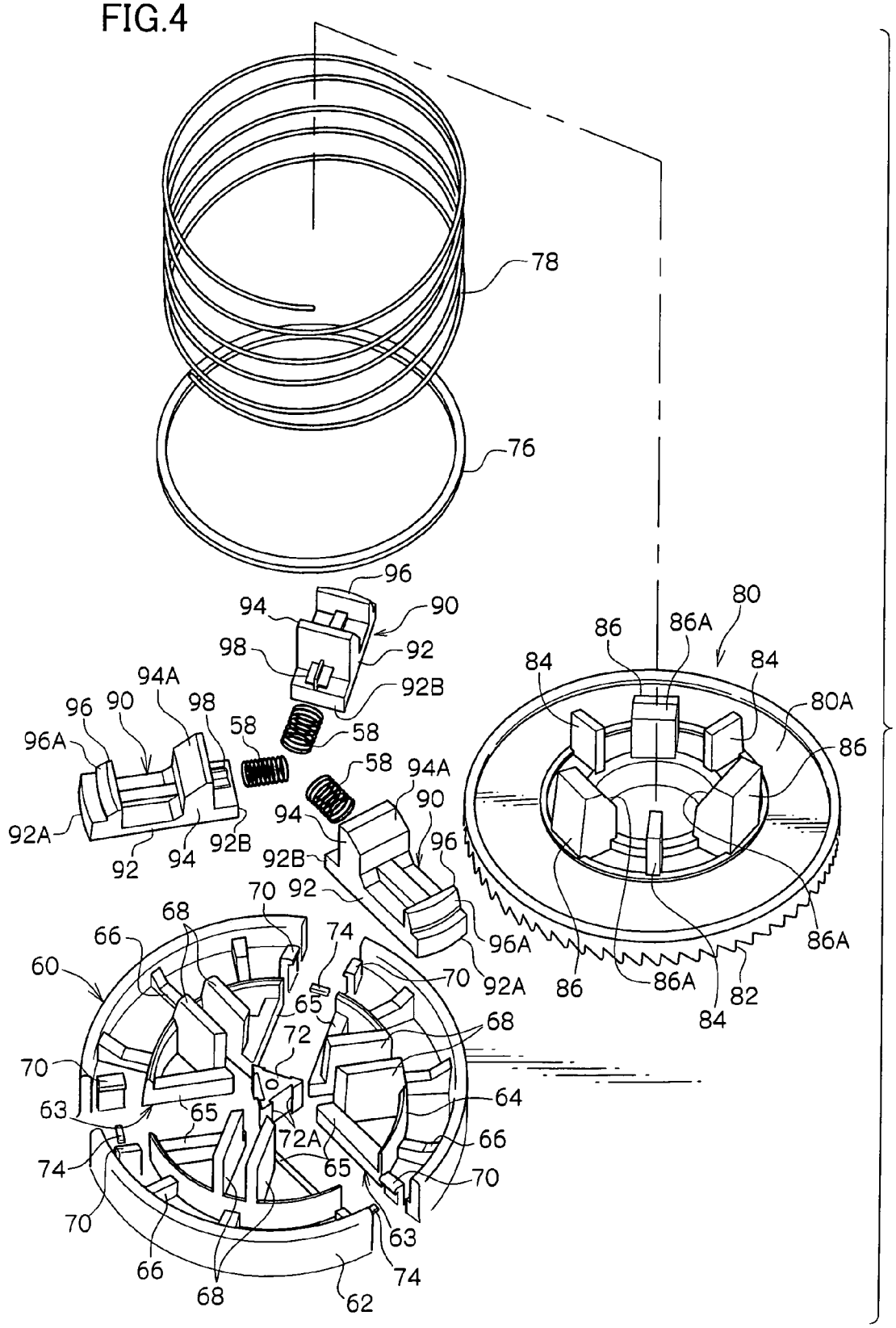
FIG. 4 is a schematic exploded perspective view showing the structure of a mounting portion formed at an upper casing.
Figure 5:
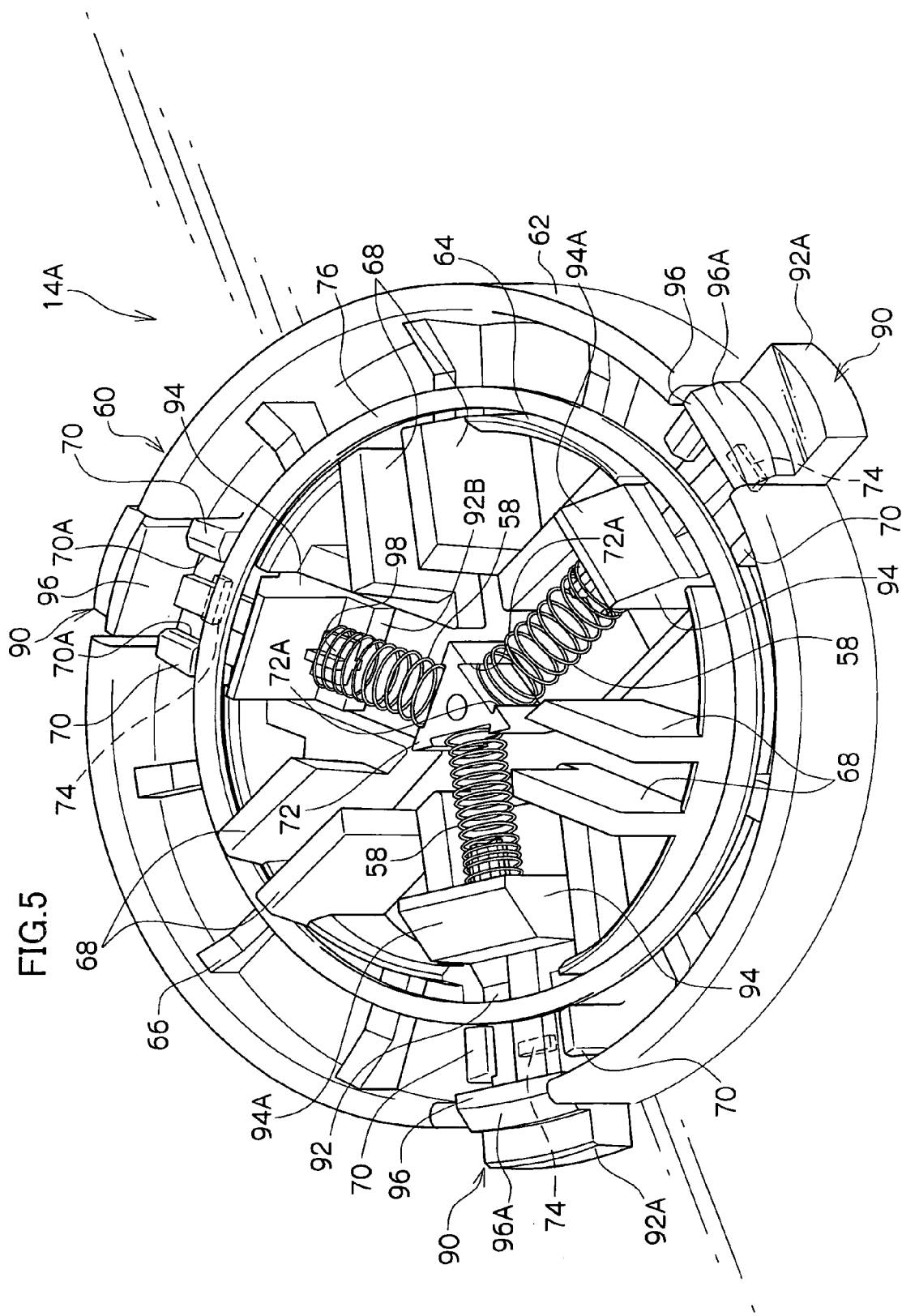
FIG. 5 is a schematic perspective view showing a mounting portion formed at an upper casing.

A mounting portion 60, as shown in FIGS. 4 and 5, is formed at the substantial center of an inner surface of top plate 14A of the upper casing 14 (above an axial center portion of the reel hub 42). The mounting portion 60 slidably accommodates the plurality of (three) lock members 90 and so forth, which engage with an upper edge portion of the reel hub 42 from the inner peripheral surface side thereof, thereby preventing the reel 40 from being moved in an axial direction (a vertical direction).

The mounting portion 60 comprises two cylindrical walls 62 and 64 which are provided to stand upright concentrically, as seen in a plan view, the outer wall being higher than the inner wall. The cylindrical walls 62 and 64 are notched at predetermined positions (at three positions spaced apart from each other at uniform intervals). Guide ribs 65 are provided upright at an inner side of the notched portions of the cylindrical wall 64 so as to extend in a radial direction. The lock members 90 are slidably accommodated in a radial direction in accommodation portions 63 defined by the guide ribs 65.

A plurality (nine in this embodiment) of plate-like support ribs 66 are provided upright in a radial direction between the cylindrical walls 62 and 64 so as to interconnect the cylindrical walls 62 and 64. Further, between the respective accommodation portions 63 and at an inner side of the cylindrical walls 64 guide wall portions 68 are provided projectingly in pairs between which the guide portions 84 of the brake member 80 are inserted, and the number of pairs of the guide wall portions 68 is equal to the number of the guide portions 84.

As shown in FIGS. 4 and 5, the pairs of the guide wall portions 68 are projectingly provided to extend in radial directions so as to be flush at outer end surfaces thereof with the outer peripheral surfaces of the cylindrical walls 64, and the space between the guide wall portions 68 of each pair is made equal to or slightly larger than the thickness of each guide portion 84.

Figure 6:
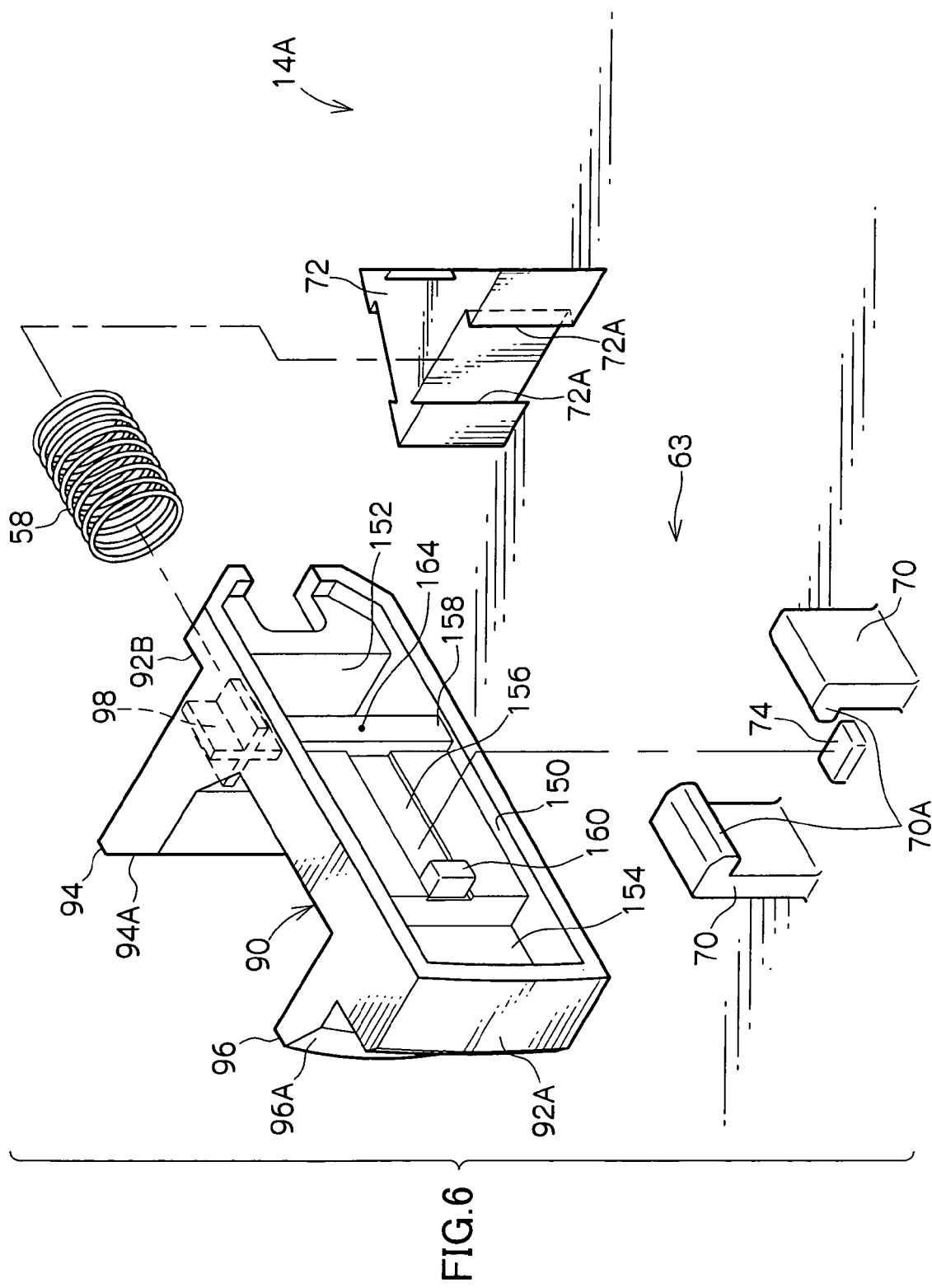
FIG. 6 is a schematic perspective view showing how a lock member and a coil spring are fitted together.
Figure 7:
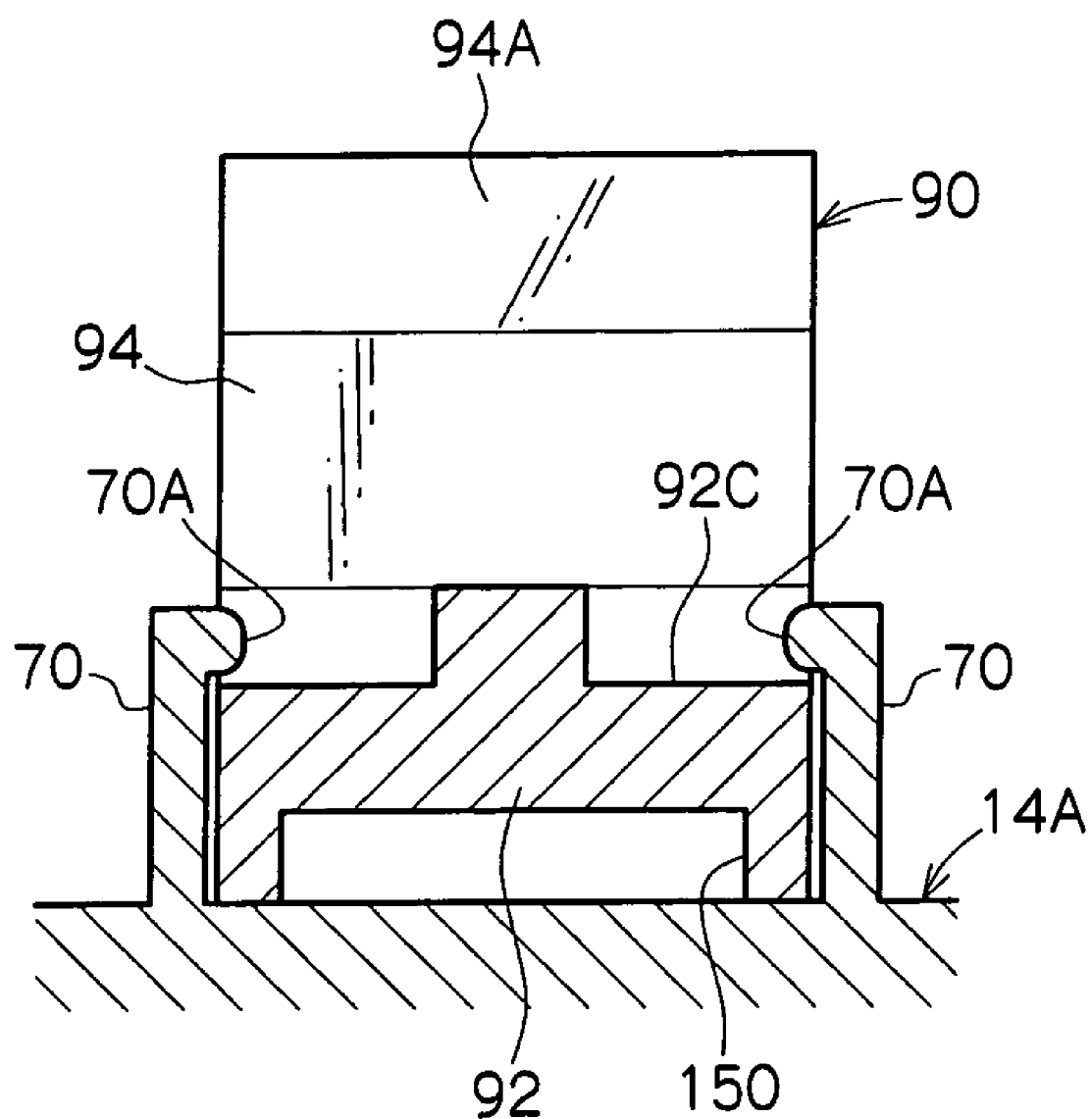
FIG. 7 is a schematic sectional view of a lock member supported by a holding portion.

Further, pairs of holding portions 70 are projectingly provided between the cylindrical walls 62 and 64 at either side of the accommodation portions 63 (along a line extended from the guide ribs 65), each pair of the holding portions 70 holding one of the lock members 90 slidably (with a small gap). On the leading ends (lower end) of the holding portions 70 of each pair undercut portions 70A are formed as projections extending inward with respect to each other (toward the lock members 90), as shown in FIGS. 6 and 7.

The undercut portions 70A serve to temporarily support the lock members 90 to the extent that they prevent the lock members 90 from dropping down (being removed) from the mounting portion 60 (from the accommodation portions 63) when the upper casing 14 is turned upside down so that the inner surface of the top plate 14A faces down and covers the lower casing (during the assembly of the case 12), after each of the lock members 90 has been incorporated in place.

More specifically, when molded in a mold, the undercut portions 70A are protruded inward to an extent that enables their being drawn from the mold (about 0.1 mm-0.5 mm, and preferably about 0.3 mm). In addition, the undercut portions 70A are formed in a substantially arcuate shape as seen from a sectional side view, thereby facilitating the drawing thereof from the mold. Meanwhile, the holding portions 70 are formed to be about 4 mm in height, and about 0.35 mm-1.2 mm, and preferably about 0.5 mm-0.8 mm, in thickness.

Further, the holding portions 70 may be formed either integrally with the upper casing 14 or separately from the upper casing 14 and fixed thereto. In an arrangement where the holding portions 70 are formed separately from the upper casing 14 and fixed thereto, it is possible that they may be attached after the lock members 90 have been placed on the upper casing 14 so that the undercut portions 70A can be formed either in a yet further protruding shape or a gate-like shape (lateral U-shape), thereby eliminating the necessity for a stopper member 76 which will be described below.

In addition, a locking projection 72 is projectingly provided at the substantial center of the top plate 14A (on the axial center line of the reel hub 42 and at the center of the mounting portion 60) so as to hold one end of coil springs 58. The coil springs 58 are provided at each of the lock members 90 and each lock member 90 is constantly urged outward in a radial direction from the center of the mounting portion 60 (center of the reel 40).

In order to hold the three coil springs 58 at the same time, the locking projection 72 is formed in a substantially triangular prism shape and, at both end portions of the side surfaces thereof, a pair of engagement teeth 72A is formed along the entire height so as to jut out toward the inner side, which can each hold one turn of the coil springs 58 by engaging therewith from either side.

Further, in the accommodation portions 63 of the mounting portion 60, between the holding portions 70, stopper ribs 74 are projectingly provided to temporarily restrain (until the upper casing 14 is placed over the lower casing 16) the lock members 90 urged by the coil springs 58 when the lock members 90 and the coil springs 58 are assembled.

Accordingly, since the lock members 90 are held by the coil springs 58 and the stopper ribs 74 with a certain amount of tension applied thereto, the structure better prevents the lock members 90 from falling and, consequently, the invention is improved in terms of ease of assembly.

Figure 8:
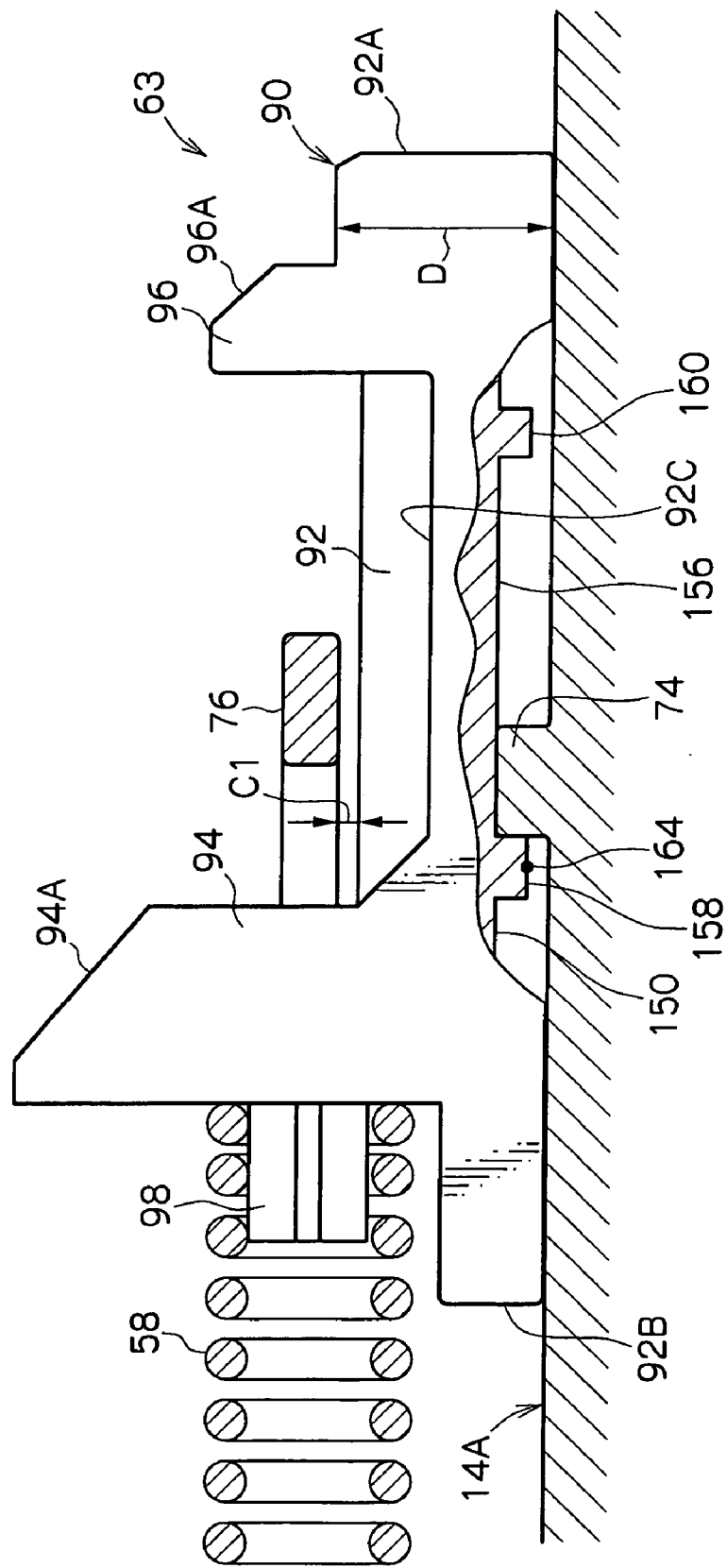
FIG. 8 is a schematic side view of a lock member supported by a holding portion.

After the lock members 90 are temporarily supported by the holding portions 70, a ring-shaped stopper member 76 formed from a resin is welded on the support ribs 66 by means of ultrasonic waves or the like, to serve as a dropping prevention member that permanently holds the lock members 90 so that they do not slide and drop off. A predetermined clearance C1 (C1=about 0.05 mm-0.4 mm) is secured between the stopper member 76 and the lock members 90 as shown in FIG. 8 in order that the lock members 90 are not hindered when the lock members 90 slide. The heights of the support ribs 66 are so defined as to secure the clearance C1.

Further, when the recording tape cartridge 10 is assembled (when the upper casing 14 is placed over the lower casing 16), the compression coil spring 78 is engaged at the upper end thereof with the stopper member 76, so that the compression coil spring 78 is held between the stopper member 76 (the upper casing 14) and the flat surface 80A (the brake member 80). The upper end of the compression coil spring 78 may be disposed in contact with the support ribs 66 instead of with the stopper member 76.

However, when the upper end of the compression coil spring 78 is disposed in contact with the stopper member 76, an improved effect can be obtained even without welding the stopper member 76 onto the support ribs 66. Further, the stopper member 76 is not limited to a ring-like configuration shown in the drawings, and it is only required that the stopper member 76 be bridged at least between the support ribs 66 on either side of the lock members 90 so as to always prevent the lock members 90 from dropping down. Still further, the structure may be arranged such that only the stopper member 76 is provided while the holding portions 70 are omitted, or such that only the holding portions 70 are provided while the stopper member 76 is omitted.

The lock members 90 are supported so as to be slidable in a radial direction within the accommodation portions 63 while being prevented from dropping down, by the holding portions 70 and the stopper member 76. Each of the lock members 90 includes a substantially rectangular column-shaped body portion 92 which is disposed in sliding contact with the inner surface of the top plate 14A of the upper casing 14. A generally rectangular column-shaped cam portion 94, which has substantially the same width as that of the body portion 92, is integrally provided, projecting orthogonally to the body portion 92 (in an axial direction of the reel 40), in the vicinity of an end portion 92B at an inner side in a radial direction of each body portion 92.

Figure 9:
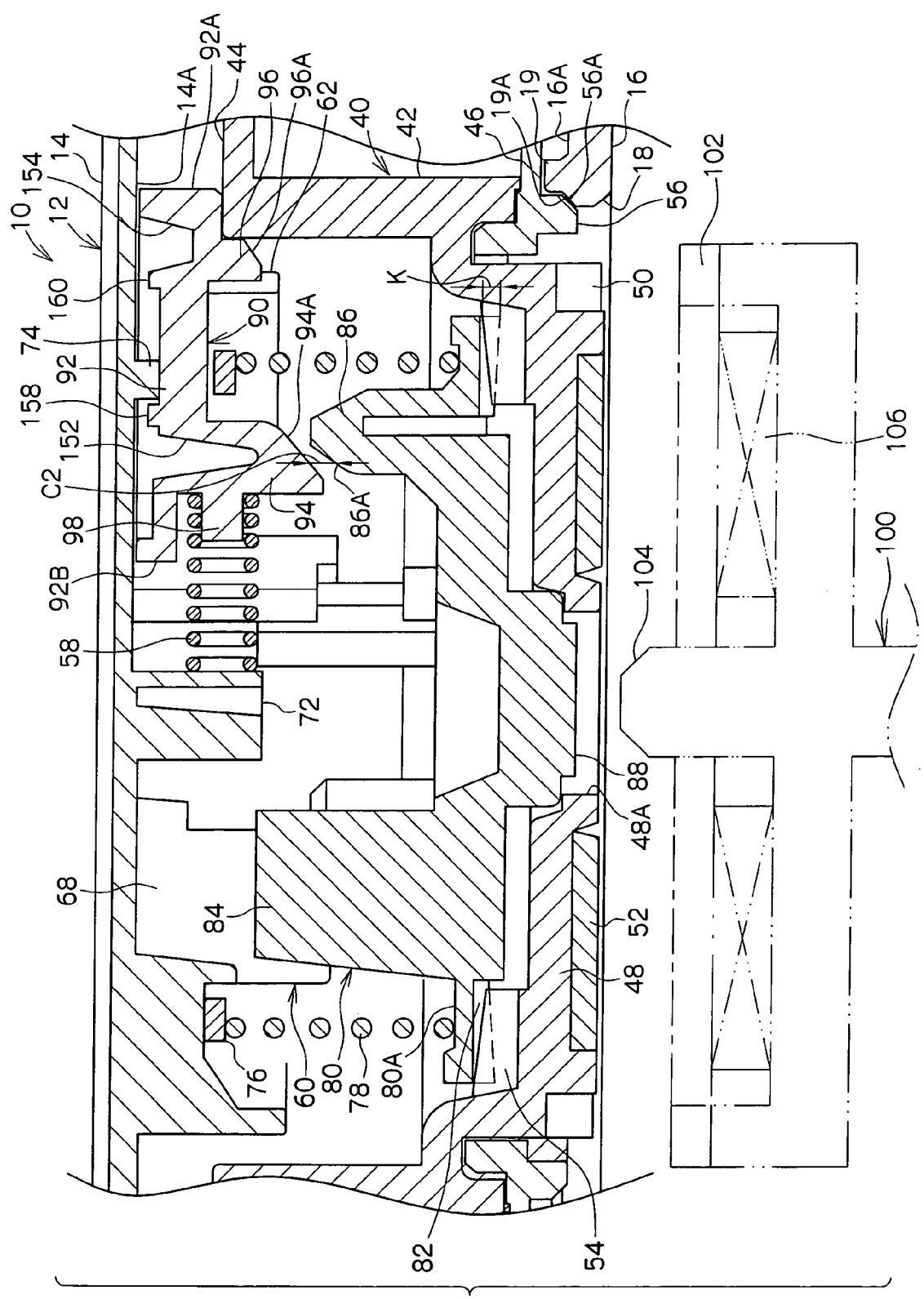
FIG. 9 is a partial enlarged schematic sectional side view of a recording tape cartridge before a rotation shaft is raised.

Further, as shown in FIGS. 6, 8 and 9, a concave portion 150 is provided as a depression on the reverse surface side of the lock members 90, and the outer edge portion of the reverse surface of the lock members 90 is the surface that slides against the inner surface of the top plate 14A.

At both end sides of the concave portion 150, lightening portions 152, 154 are respectively formed at portions corresponding to the cam portion 94 and an engagement portion 96 with substantially equal thickness to the cam portion 94 and the engagement portion 96.

A groove portion 156 is formed along a central portion in a width direction of the lock members 90 between the lightening portion 152 and the lightening portion 154 so as to be engageable with the stopper rib 74. As a result, the lock members slide within the accommodation portions 63 as guided by the stopper ribs 74 via the groove portions 156.

Contact portions 158, 160 are provided projectingly at either end side portions of the groove portions 156 of the lock members 90 and movement of the lock members 90 is restricted by contact of the contact portions 158, 160 with the stopper ribs 74. The contact portions 158, 160 are respectively provided so as to be lower than the inner surface of the top plate 14A such that when the lock members 90 slide, the contact portions 158, 160 do not slide against the inner surface of the top plate 14A.

A cruciate insert portion 98 of predetermined length is provided at the inner side surface in a radial direction of the cam portion 94 so as to project inward in a radial direction, and is fitted to an end of the coil spring 58 by insertion therein. The outer diameter of the insert portion 98 is formed to be slightly larger than the inner diameter of the coil spring 58 such that the coil spring 58 does not become detached from the insert portion 98. Further, the end portion 92B is provided at an inner side in a radial direction of the cam portion 94 so as to extend inward in a radial direction to a predetermined length (such that it is slightly longer than the insert portion 98).

Accordingly, when the lock members 90 and the coil springs are assembled to the mounting portion 60 (in the accommodation portions 63) such that the centers of gravity of the lock members can be configured at a low position, and the lock members 90 are held between the locking projection 72 and the stopper ribs 74, the lock members 90 can be further prevented from flying out of the mounting portion 60 (out of the accommodation portions 63) due to the tension of the coil springs 58. In other words, such a structure further improves the ease of assembly of the lock members 90 and the coil springs 58.

Figure 14A:
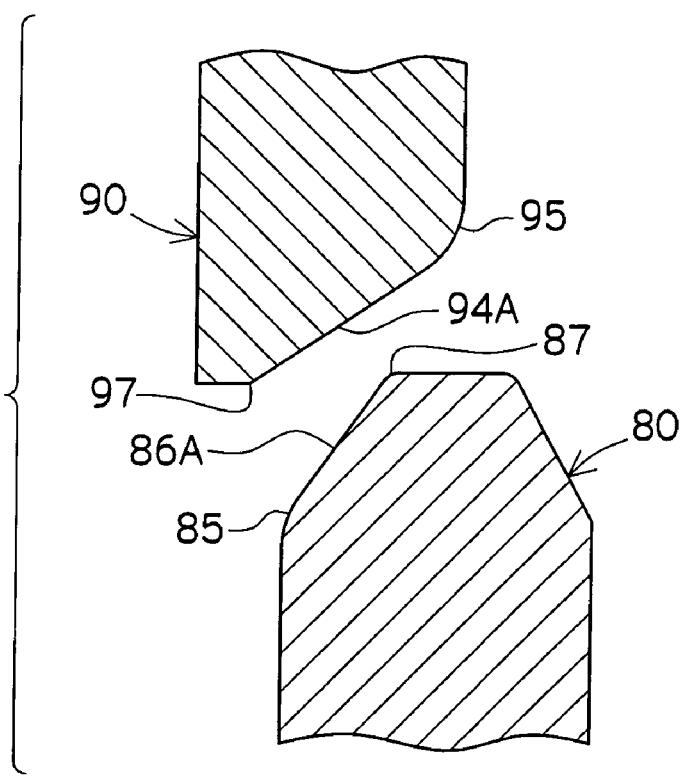
FIG. 14A is a sectional view showing a state before a brake member contacts with a lock member.

Further, a tapered surface (cam surface) 94A is formed at an incline of 30 to 60° to an axial line of the reel hub 42 at a lower end surface at an outward side of the cam portions 94. As shown in FIG. 14A, the tapered surface 94A has a gentler gradient than the tapered surface 86A of the brake member 80, such that the tapered surface 86A line contacts the tapered surface 94A. R portion 95 is disposed at an upper end portion of the tapered surface 94A.

Figure 10:
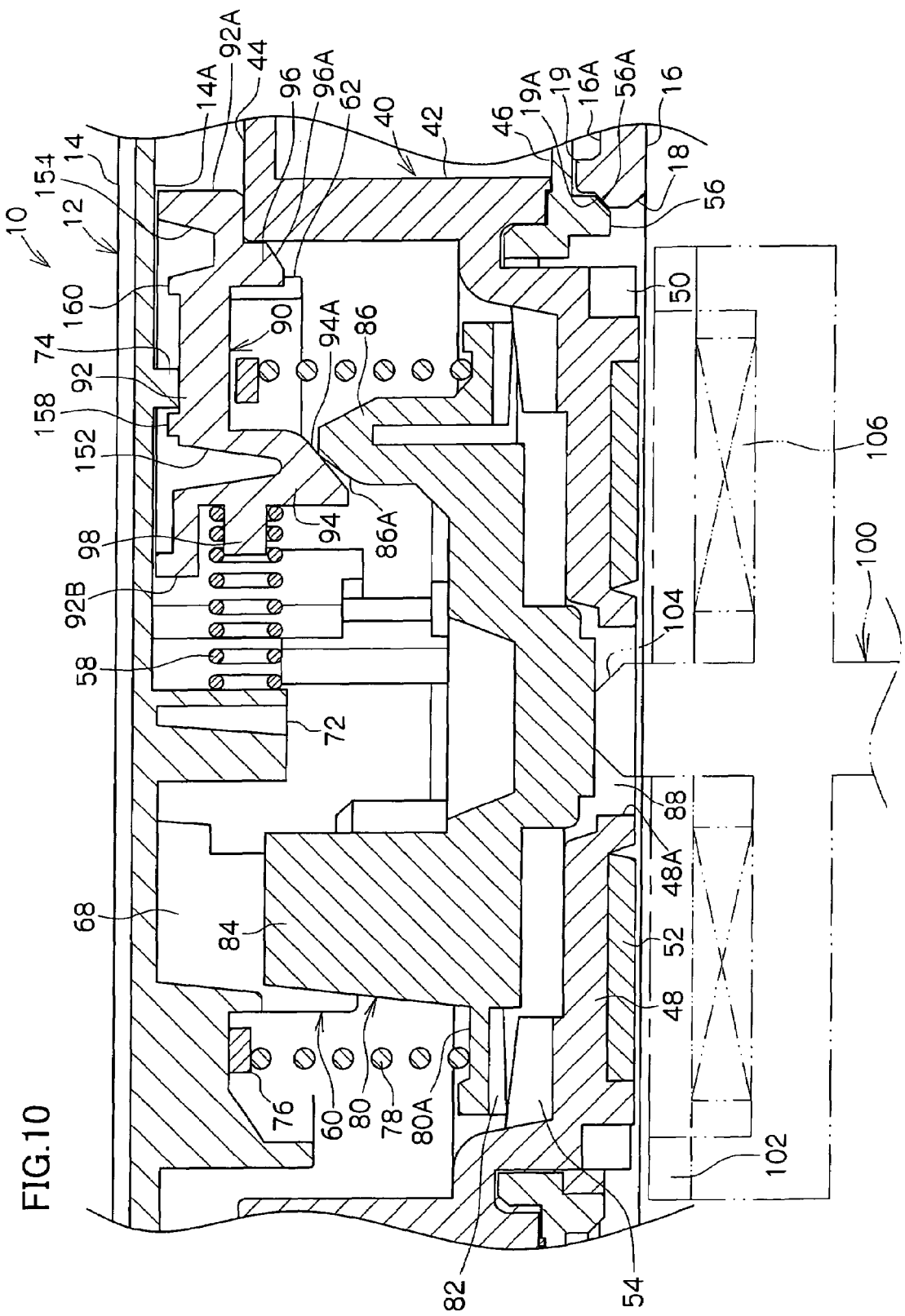
FIG. 10 is a partial enlarged schematic sectional side view of a recording tape cartridge while a rotation shaft is being raised.
Figure 11:
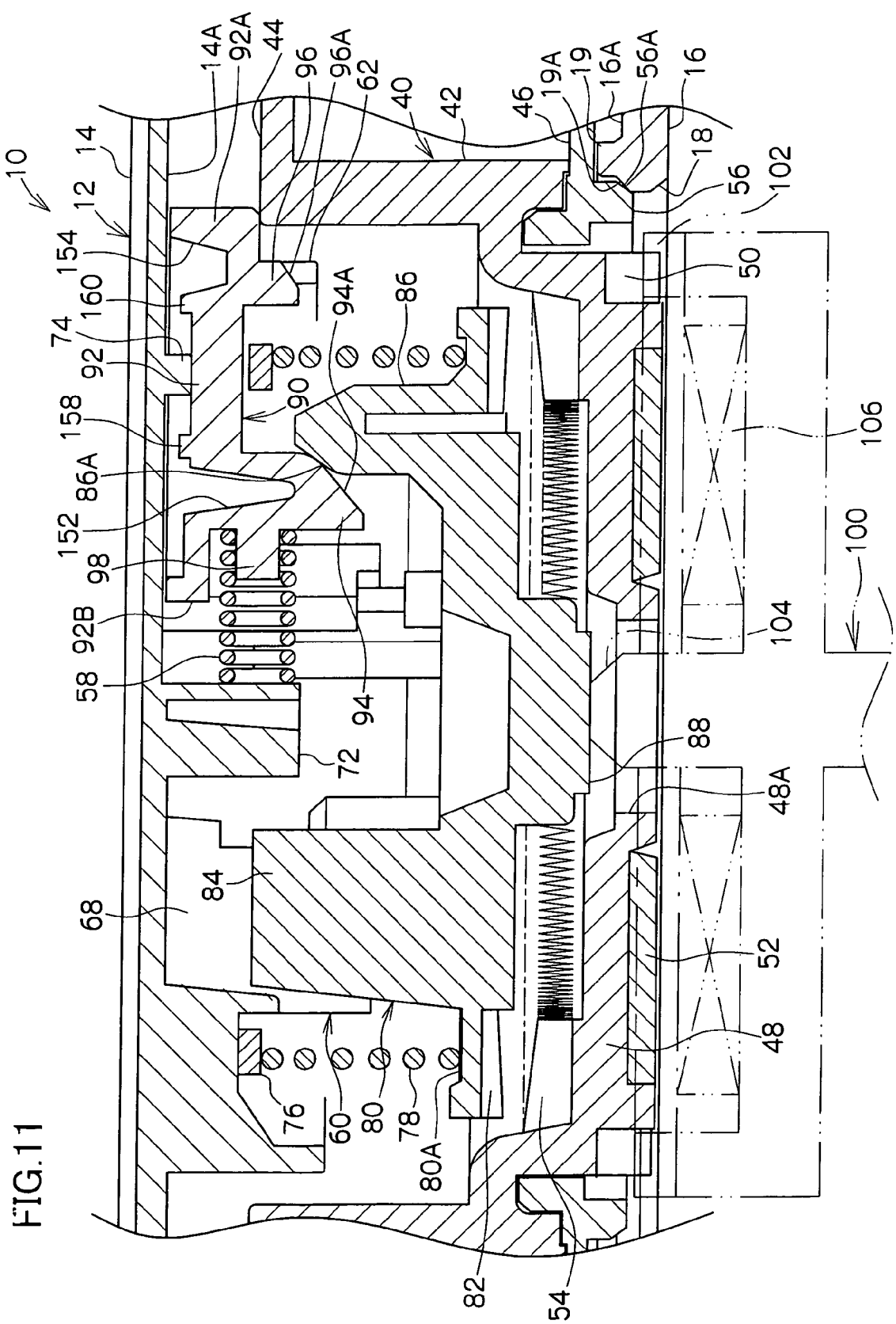
FIG. 11 is a partial enlarged schematic sectional side view of a recording tape cartridge while a rotation shaft is being raised.

In a state in which the tapered surface 86A of the brake member 80 contacts the tapered surface 94A of the lock members 90 as shown in FIG. 10, a pressure force from the brake member 80 acts on the lock member 90. The pressure force is divided into a force that acts horizontally with respect to the tapered surface 94A and a force that acts vertically with respect to the tapered surface 94A (component forces). The lock members 90 are forced against the upper casing 14 side by the force acting in a vertical direction with respect to the tapered surface 94A, and are pressed in a direction opposing the biasing force of the coil springs 58 by the force acting in a horizontal direction, sliding along the inner surface of the top plate 14A of the upper casing 14.

Thickness D (see FIG. 8) of end portion 92A at an outer side in a radial direction (further towards the outer side than engagement portion 96) of the lock members 90 (body portion 92) is formed to be substantially the same as distance W (see FIG. 2) in the case 12 between the upper surface of the upper flange 44 when the reel 40 is positioned at the lowest position and the inner surface of the top plate 14A.

Further, an engagement portion 96 is provided in the vicinity of the end portion 92A at an outer side in a radial direction so as to project vertically with respect to the body portion 92 (in an axial direction of the reel 40), which has a predetermined height and engages with the upper edge portion of the reel hub 42. The engagement portion 96 has the same width as the body portion 92 and does not project as far as the cam portion 94. An outward side of a lower end surface of the engagement portion 96 is configured as a tapered surface 96A inclined at a predetermined angle. The shape of the outer side surface including the tapered surface 96A is configured as an arcuate surface which conforms with the inner peripheral surface of the reel hub 42 as seen in plan view.

Thus, the lock member 90, which is temporarily retained by the stopper rib 74, is configured such that the engagement portion 96 can be readily engaged with the upper edge portion of the reel hub 42 during the operation when the recording tape cartridge 10 is assembled (when the upper casing 14 is placed over the lower casing 16). After engagement the end portion 92A at an outer side in radial direction of the body portion 92 is spaced apart from the stopper rib 74, as shown in FIGS. 2 and 9.

It is preferable that the draft angle of the mold for the inner peripheral surface of the reel hub 42 be zero degrees in order that the outer surface of the engagement portion 96, except for the tapered surface 96A, contacts with (is pressed against) the inner peripheral surface of the reel hub 42. When the draft angle is larger than zero degrees, the upper edge portion of the reel hub 42 tends to expand outwardly (the diameter of the upper edge portion becomes larger) so that a pressing force by the engagement portion 96 is decreased, as a result of which the lock members 90 may no longer function appropriately.

With the above-described structure, when the recording tape cartridge 10 is not in use, the brake member 80 is downwardly biased due to a biasing force of the compression coil spring 78, while the lock members 90 are biased outward in a radial direction due to a biasing force of the coil springs 58, as shown in FIGS. 2 and 9. Consequently, the brake member 80 is prevented from rotating with respect to the case 12 because of the guide portions 84 being inserted between the guide wall portions 68, and the reel 40 is prevented from being inadvertently rotated because of the brake gear 82 of the brake member 80 being strongly meshed with the engagement gear 54 in the reel hub 42.

When the recording tape cartridge 10 is not in use, the reel 40 is prevented from being moved upward because the engagement portions 96 of the lock members 90 are engaged with the upper edge portion of the reel hub 42; that is, because the outer surfaces of the engagement portions 96 except for the tapered surfaces 96A are pressed against the inner peripheral surface of the reel hub 42 so that the end portions 92A at an outer side in a radial direction of the engagement portions 96 of the body portions 92 are interposed between the upper surface of the upper flange 44 and the inner surface of the top plate 14A (due to the thickness D of the end portion 92A being substantially equal to the distance between the upper surface of the upper flange 44 and the inner surface of the top plate 14A).

When the recording tape cartridge 10 is not in use, the engagement projection 86 and the cam portion 94 are in a state of non-contact with each other so as to prevent the component force of the coil spring 58 from acting on the brake member 80. The clearance C2 between the opposing tapered surfaces 86A and 94A in the axial direction of the reel 40 (in the direction of movement of the brake member 80) is made smaller than an amount of meshing K between the brake gear 82 and the engagement gear 54 (in other words, smaller than an ascending stroke of the brake member 80 until the meshing between the brake gear 82 and the engagement gear 54 is released).

This is because if the clearance C2 is larger than the amount of meshing K, the brake member 80 will be very likely to be moved upward a distance equal to the clearance C2 by an impact due to dropping or the like and consequently the reel 40 will become capable of being inadvertently rotated. Accordingly, the clearance C2 between the engagement projection 86 and the cam portion 94 is extremely small. Thus, when the recording tape cartridge 10 is not in use, the reel 40 and the brake member 80 are practically incapable of being moved upward (incapable of being moved axially of the reel).

Figure 12:
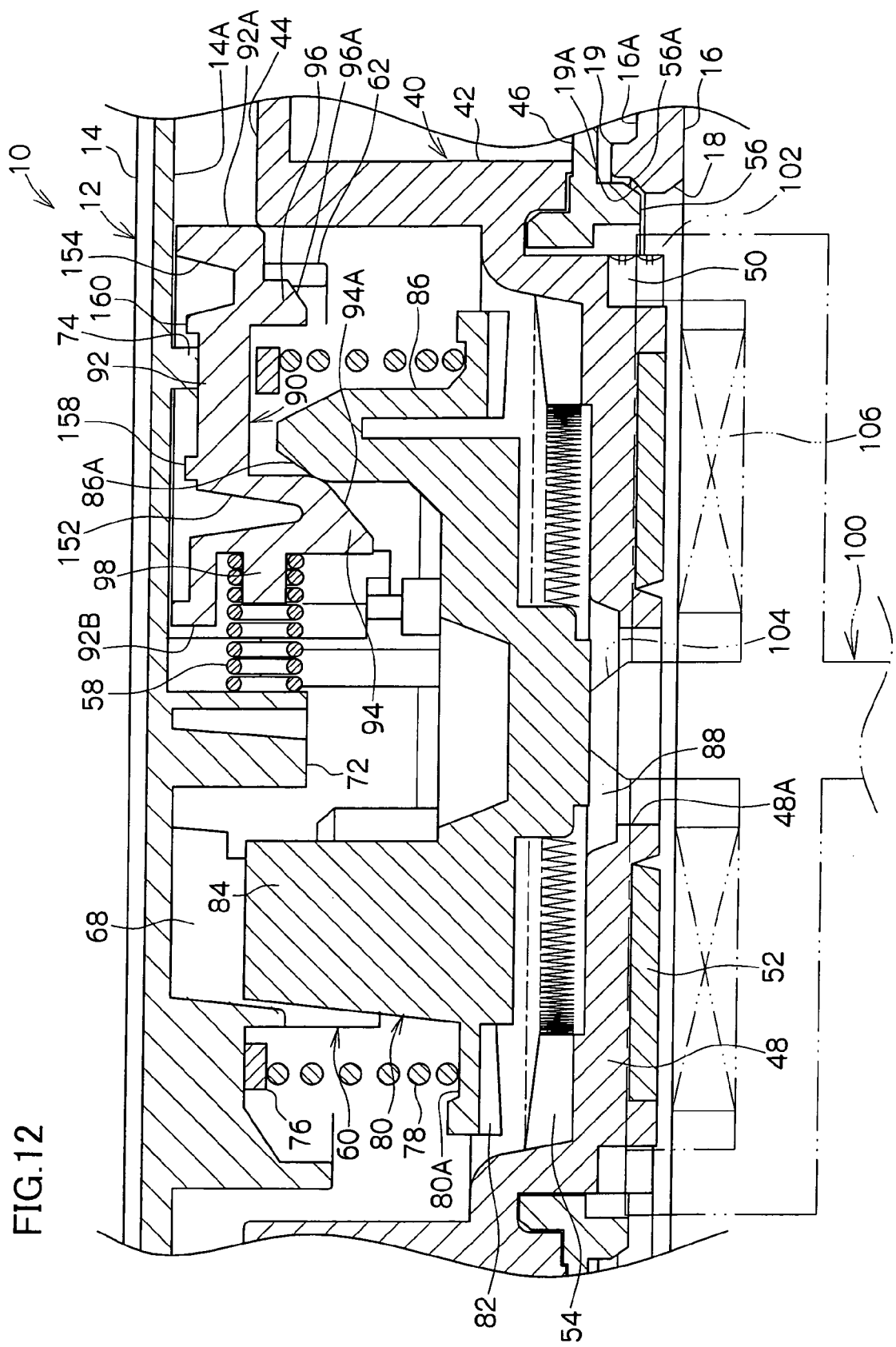
FIG. 12 is a partial enlarged schematic sectional side view of a recording tape cartridge while a rotation shaft is being raised.

When the recording tape cartridge 10 is in use, as shown in FIGS. 3 and 12, together with the brake gear 82 and the engagement gear 54 being released from a meshed state, the tapered surfaces 86A of the engagement projections 86 of the brake member 80 contact with and press against the tapered surfaces 94A of the cam portions 94 of the lock members 90, and the lock members 90 are caused to slide toward the inner side in a radial direction against the biasing force of the coil springs 58.

As a result, together with the outer side surface of the engagement portion 96 moving away from the inner peripheral surface of the reel hub 42, the outer side end portion 92A of the body portion 92 is withdrawn from between the upper surface of the upper flange 44 and the inner surface of the top plate 14A, such that the reel 40 becomes capable of moving upward to a predetermined height and thus rotatable.

When the brake member 80 moves upward, the cam portion 94 intrudes at an inner side of the engagement projection 86, and thereupon, only the outer side surface of the cam portion 94 is brought into contact with the inner side surface of the engagement projection 86. The upper end surface of the engagement projection 86 is thus disposed out of contact with the lock member 90 and, further, the lower end surface of the cam portion is disposed out of contact with the brake member 80. Since the inside surface of the engagement projection 86 and the outside surface of the cam portion 94 each has a mold draft angle of 0 degrees, the pressing force (biasing force) of the coil spring 58 which presses the lock member 90 is received by the inner peripheral surface of the engagement projection 86, so that a component force tending to press the brake member 80 down is not generated.

Thus, during rotation of the reel 40, the pressing force (biasing force) of the coil springs 58 acts in a radial direction of the reel 40 and does not act axially of the reel 40 (the biasing force is not transmitted axially of the reel 40). Consequently, each lock member 90 is stably held in an unlocked state. Further, since the pressing force (biasing force) exerted axially (vertically) of the reel 40 is only the biasing force of the compression coil spring 78 as is the case with the prior art, it is possible to arrange, despite the provision of the coil springs 58 in the structure, that no extra load is applied to the rotary shaft 100 in an axial direction (in a downward direction).

Preferably, a recess portion 92C (or, alternatively, a convex portion) is formed as appropriate at the lower surface of the body portion 92 of each lock member 90 that is disposed in contact with the stopper member 76, as shown in FIGS. 7 and 8. By forming such recess portions 92C (or convex portions), it is possible to decrease the contact area between the inner surface of the top plate 14A of the upper casing 14 and the stopper member 76 so that each lock member 90 is able to slide with a low resistance.

Further, as shown in FIGS. 6 and 9, concave portions 150 are provided as depressions at the reverse surface sides of lock members 90 and only the outer edge portions of the reverse surfaces of the lock members 90 are the surfaces that slide against the inner surface of the top plate 14A.

In addition, the stopper ribs 74, which restrict the movement of the lock members 90, are provided between the holding portions 70 provided within the accommodation portions 63 at the top plate 14A. Since the accommodation portions 63 are positioned further at an inner side than the reel hub 42 of the reel 40, the stopper ribs 74 are disposed at an inner side of the reel hub 42. Accordingly, even if the recording tape cartridge 10 were to fall and the reel 40 become unlocked, the stopper ribs 74 would not contact the reel 40 and there is no risk that concentrated stress would act upon the reel 40 due to the stopper ribs 74.

Description will next be made of the operation of the recording tape cartridge 10 structured as described above.

When the recording tape cartridge is not in use (when it is not loaded into a drive device), the opening 20 is occluded by the leader block 22. The reel 40 is urged downward by the compression coil spring 78 via the brake member 80. That is, the brake gear 82 of the brake member 80 is firmly meshed with the engagement gear 54 inside of the reel hub 42 due to the biasing force of the compression coil spring 78, preventing inadvertent rotation of the reel 40.

Further, each lock member 90 is urged from the center of the mounting portion 60 (the axial center of the reel 40) in a radially outward direction by the biasing force of the coil springs 58, and thus the engagement portions 96 are engaged with the upper edge portion of the reel hub 42. That is, the inner peripheral surface of the reel hub 42 is pressed by the outside surface excluding the tapered surface 96A of the engagement portions 96, and the end portions 92A, which are provided at an outer side in a radial direction of the engagement portions 96, of the body portions 92 are interposed between the upper surface of the upper flange 44 and the inner surface of the top plate 14A.

The outer side end portions 92A of the lock members 90 (body portion 92) are configured such that the thickness D thereof is substantially equal to the distance W between the upper surface of the upper flange 44 and the inner surface of the top plate 14A when the reel 40 is located at the lowermost position, so that the reel 40 is prevented by the lock members 90 from being moved upward. That is, the reel 40 will never be moved upward even if the recording tape cartridge 10 is impacted due to being dropped or the like.

Further, since the clearance C2 between the cam portion 94 of each lock member 90 and the engagement projection 86 of the brake member 80 is extremely small, or smaller than the amount of meshing K between the brake gear 82 and the engagement gear 54, the brake member 80 will not be substantially moved upward even if the recording tape cartridge 10 is impacted due to dropping or the like. Thus, there is no possibility that the brake gear 82 is disengaged from the engagement gear 54, and no adverse influence is imparted to the recording tape T.

When recording data onto the recording tape T of the recording tape cartridge 10 or reproducing data recorded on the recording tape T of the recording tape cartridge 10, the recording tape cartridge 10 is loaded into a drive device (not shown). More specifically, the recording tape cartridge 10 is inserted from the front wall 12A side into a loading slot (not shown) of the drive device in the direction of arrow A.

When the recording tape cartridge 10 is loaded (inserted) into a drive device the release projection 104 is inserted from the through hole 48A when either the recording tape cartridge 10 is lowered a predetermined distance or the rotary shaft 100 is moved upward. Then, the release projection 104 pushes the operation projection 88 upward and the brake gear 82 of the brake member 80 is released from meshing with the engagement gear 54 inside the reel hub 42.

In addition, the release projection 104 of the rotary shaft 100 positions the reel 40 in a height direction thereof via the operation projection 88 and the reel plate 52 is attached to the magnet 106. As a result, the recording tape cartridge 10 (the reel 40) is accurately positioned within the drive device and in this state the drive gear 102 meshes with the reel gear 50.

As shown in FIG. 10, when the release projection 104 pushes the operation projection 88 upward, the brake member 80 moves upward in opposition to the biasing force of the compression coil spring 78, and the engagement projections 86 contact the cam portions 94 of the lock members 90 and push the cam portions 94 upward.

As a result, the tapered surfaces 94A of the cam portions 94 slide against the tapered surfaces 86A of the engagement projections 86 and the lock members 90 begin to slide toward an inner side in a radial direction along the inner surface of the top plate 14A (within the accommodation portions 63) in opposition to the biasing force of the coil springs 58.

Then, since recess portions 92C are formed in the body portions 92, the lock members 90 can slide with low resistance. Further, due the stopper member and the like, the lock members do not move apart from the accommodation portions 63 (the mounting portion 60) and can slide in a stable state.

Thus, when the lock members 90 begin to slide toward an inner side in a radial direction within the accommodation portions 63, the outer side surfaces of the engagement portions 96 of the lock members 90 separate from the inner peripheral surface of the reel hub 42 and the outer side end portions 92A of the body portions 92 begin to withdraw from between the upper surface of the upper flange 44 and the inner surface of the top plate 14A.

Then, together with the brake gear 82 being released from meshing with the engagement gear 54, the drive gear 102 begins to mesh with the reel gear 50 and, as shown in FIG. 12, when the amount of meshing between the drive gear 102 and the reel gear 50 reaches substantially half the height of the gear teeth, the lock members 90 are completely withdrawn from between the upper surface of the upper flange 44 and the inner surface of the top plate 14A.

That is to say, the lock members 90 continue to lie between the upper surface of the upper flange 44 and the inner surface of the top plate 14A, such that the reel 40 cannot move upward, until the amount of meshing between the drive gear 102 and the reel gear 50 becomes substantially about half the height of the gear teeth. Accordingly, even when the recording tape cartridge 10 is loaded into a drive that has been arranged vertically, the reel 40 does not become misaligned downward in a vertical direction (the direction of arrow C shown in FIGS. 2 and 3).

In other words, the reel 40 is prevented from becoming displaced (off-center) with respect to the case 12 due to the annular rib 56 provided to stand out from a lower surface of the reel 40 being supported by the annular rib 19 provided to stand upright at a peripheral edge of the gear opening 18.

When the amount of meshing between the drive gear 102 and the reel gear 50 becomes substantially about half the height of the gear teeth, the lock members 90 completely withdraw from between the upper surface of the upper flange 44 and the inner surface of the top plate 14A such that the outer side end portions 92A thereof are disposed at an inner side of the reel hub 42, the reel 40 becomes capable of upward movement, and begins to move upward due to the rotary shaft 100.

As a result, while the annular rib 56 moves away from above the annular rib 19, since the reel 40 (the reel gear 50) is supported by the drive gear 102 and the reel plate 52 is attracted and affixed to the magnet 106, the reel 40 still does not become misaligned vertically downward (in the direction of arrow C).

After this, when the drive gear 102 completely meshes with the reel gear 50 and the reel plate 52 is attached to the magnet 106, the rotary shaft is further raised to a predetermined height as shown in FIGS. 3 and 12. With this, the cam portions 94 penetrate past (fall behind) an inner side of the engagement projections 86 such that the outer side surfaces of the cam portions 94 contact the inner side surfaces of the engagement projections and the lock members 90 are held in an unlocked position. Thus, positioned at this predetermined height, the reel 40 becomes rotatably drivable.

A drive device extraction member (not shown) engages with the coupling portion 28 of the leader block 22 and draws the leader block 22 out from the case 12. Since the recording tape cartridge 10 is now accurately positioned inside the drive device, the extraction member can reliably engage with the coupling portion 28 of the leader block 22. Accordingly, the leader block 22 extracted from the recording tape cartridge 10 is accommodated within an insert portion formed at a take-up reel hub (not shown) at the drive device side.

When the leader block 22 is accommodated in the take-up reel insert portion the reel 40 and the take-up reel are driven so as to rotate in synchronization by the rotary shaft 100. As a result, the recording tape T is gradually extracted from inside the recording tape cartridge 10 while being wound onto the take-up reel and data is recorded on the recording tape T or reproduced therefrom by record/playback heads disposed along a given tape path.

When the recording tape cartridge 10 is to be ejected from the drive device, the recording tape T is first rewound onto the reel 40 such that the leader block occludes the opening 20. The reel 40 and the brake member 80 begin to move downward due to the biasing force of the compression coil spring 78 when either the recording tape cartridge 10 is raised upward or the rotary shaft 100 is lowered.

With this, the lock members 90 begin to slide toward an outer side in a radial direction inside the accommodation portions 63 due to the biasing force of the coil springs 58. In other words, the tapered surfaces 94A of the cam portions 94 begin to slide up the tapered surfaces 86A of the engagement portions 86.

When the rotary shaft is then lowered further, the magnet 106 comes apart from the reel plate 52 and the drive gear 102 starts to become released from meshing with the reel gear 52. When the amount of meshing between the drive gear 102 and the reel gear 52 has decreased to substantially about half of the height of the teeth, the outer side end portions 92A of the lock members 90 (body portions 92) start to intervene between the upper surface of the upper flange 44 and the inner surface of the top plate 14A.

That is to say, before the drive gear 102 is completely released from meshing with the reel gear 50 (while the rotary shaft 100 is supporting the reel 40) the lock members 90 intervene between the upper surface of the upper flange 44 and the inner surface of the top plate 14A to hold the reel 40 between the lock members 90 and the lower casing 16, thus preventing the reel 40 from moving upward.

Accordingly, even when the recording tape cartridge is ejected from a drive device that has been that has been placed vertically on its side, the reel 40 is not displaced in a vertically downward direction (the direction of arrow C) and locking is reliably implemented by the lock members 90. That is to say, the upper surface of the reel 40 is pressed by the lock members 90 such that the reel 40 cannot move upward, and the annular rib 56 provided projectingly at the lower surface of the reel 40 is supported by the annular rib 19 so that the reel 40 is prevented from being displaced (off-center) with respect to the case 12.

After this, when the rotary shaft 100 is lowered further and the drive gear 102 is completely released from meshing with the reel gear 50, the engagement portions 96 engage with the upper edge portion of the reel hub 42. In other words, the outer side surfaces of the engagement portions not including the tapered surfaces 96A press against the inner peripheral surface of the reel hub 42 due to the biasing force of the coil springs 58.

Then, when the tapered surfaces 86A of the engagement projections 86 come apart from the tapered surfaces 94A of the cam portions 94 and the release projection 104 comes apart from the operation projection 88, the brake member 80 is lowered to its lowest position and the brake gear 82 securely meshes with the engagement gear 54 due to the biasing force of the compression coil spring 78. This results in an arrangement whereby inadvertent rotation of the reel 40 is again prevented.

Thus, when the rotary shaft 100 is withdrawn from the gear opening 18, the recording tape cartridge 10 is extracted from the loading mouth.

As explained above, when the recording tape cartridge 10 is loaded into a drive device that has been placed on its side, since the lock members 90 are structured such that they are not completely withdrawn from between the upper surface of the upper flange 44 and the inner surface of the top plate 14A until the amount of meshing of the drive gear 102 with the reel gear 50 reaches substantially about half of the height of the teeth or, in other words, such that they adopt a position allowing upward and downward movement, that is, allowing movement of the reel 40 in an axial direction in accordance with the timing whereby the reel 40 begins to move upward due to the meshing operation of the drive gear with respect to the reel gear, the reel 40 is not displaced vertically downward (in the direction of arrow C).

That is to say, since the reel 40 is allowed to move (becomes unsupported) in an axial direction when the lock members 90 have adopted a position allowing upward and downward movement, there is a risk that it might be displaced downward due to its own weight; however, since at this time the drive gear 102 is already meshed to a certain extent with the reel gear 50, the reel 40 (reel gear 50) is supported by the rotary shaft 100 (drive gear 102). Accordingly, off-centering (axial displacement) of the reel 40 with respect to the rotary shaft 100 does not occur.

Further, when the recording tape cartridge is extracted from the drive device that has been placed on its side, since the lock members 90 are structured so as to adopt a position locking upward-downward movement that prevents movement of the reel 40 in an axial direction by intervening between the upper surface of the upper flange 44 and the inner surface of the top plate 14A until the meshing of the drive gear 102 with the reel gear 50 is released (before it is completely released), the lock members 90 can optimally and reliably lock the reel 40. Accordingly, even if the meshing between the drive gear 102 and the reel gear 50 is released, the reel 40 is not displaced vertically downward (in the direction of arrow C).

Incidentally, as shown in FIGS. 9-12, while the brake member 90 contacts with the lock members 90 and the lock members 90 are caused to move horizontally by the upward-downward movement of the brake member 80, since the brake member 80 does not contact the gravity centers of the lock members 90, a torque acts on the lock members 90 and the lock members 90 are tilted.

For this reason, as shown in FIG. 8, the stopper member 76 is contacted against the lock members 90 so that the stopper member 76 counteracts the torque. However, the clearance C1 is provided between the lock members 90 and the stopper member 76 so that the sliding of the lock members 90 is not impeded, and tilting of the lock members 90 occurs to the extent of the clearance C1, with the result that there is a possibility of lopsided contact occurring at the sliding surface of the lock members 90.

Since the lock members 90 move to-and-fro in a state of contact with the inner surface of the upper casing 14 when the recording tape cartridge 10 is repeatedly used and not used, the contacting portions of the lock members 90 are worn away by the lopsided contact and powder (ground residue) is generated from the contacting portions of the lock members 90. As a result, something like the so-called adhesion phenomenon occurs, whereby resistance to sliding increases and the releasing power required to release the reel 40 from a state of non-use increases.

Figure 14B:
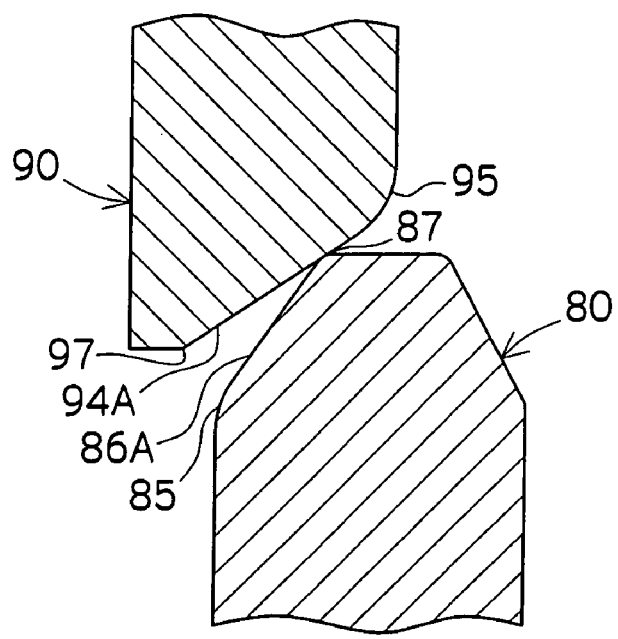
FIG. 14B is a sectional view showing a state where an end portion of a tapered surface of the brake member is contacting against a tapered surface of the lock member.

Because of this, as shown in FIGS. 14A and 14B, the tapered surfaces 86A of the brake member 80 and the tapered surfaces 94A of the lock members 90 are arranged so as not to contact surface-to-surface, by changing the angle of inclination of the tapered surfaces 86A and the tapered surfaces 94A which contact each other.

In other words, the upper end portion 87 of tapered surfaces 86A of the brake member 80 contacts the tapered surfaces 94A of the lock members 90 in a state of line contact. Further, since it is favorable for the tapered surfaces 86A and the tapered surfaces 94A not to contact surface-to-surface, contact is not limited to line contact and may also be point contact.

As a result, when compared to a situation where the tapered surfaces 86A and the tapered surfaces 94A contact surface-to-surface, the area of contact between the brake member 80 and the lock members 90 is made smaller and abrasion due to the sliding of the lock members 90 can be reduced. At the same time, smooth movement of the lock members 90 can be obtained. As a result, an increase in contact resistance due to abrasion can be avoided, as can an increase in the releasing power required to release the reel 40 from a state of non-use.

Here, surface-to-surface contact refers to an arrangement whereby it is possible for a wide area of the tapered surfaces 86A and the tapered surfaces 94A to contact each other when the tapered surfaces 86A and the tapered surfaces 94A are formed with the same angle of inclination. This does not include a case when, for example, an R portion is formed at the upper end portion 87 of the tapered surfaces 86A and the R portion contacts the tapered surfaces 94A such that a portion of partial surface-to-surface contact occurs.

Figure 14C:
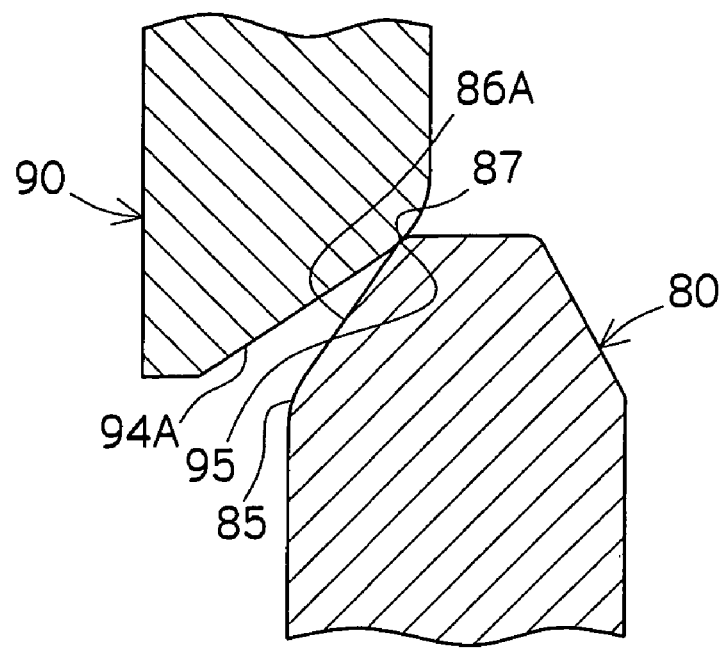
FIG. 14C is a sectional view showing a state where an end portion of a tapered surface of the brake member is contacting against an end portion of a tapered surface of the lock member.
Figure 14D:
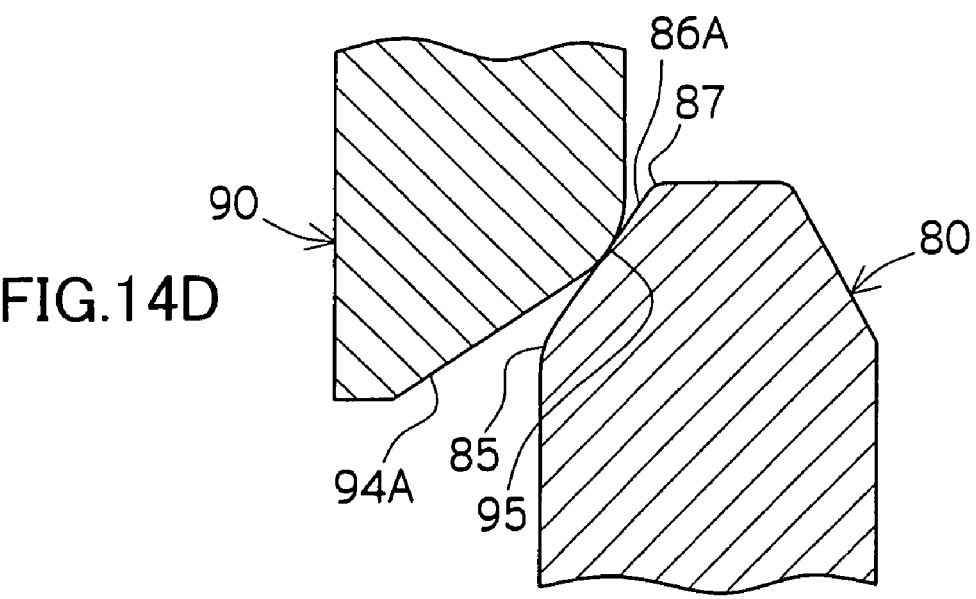
FIG. 14D is a sectional view showing a state where a tapered surface of the brake member is contacting against an end portion of a tapered surface of the lock member.

Since the angle of the tapered surfaces 86A of the brake member 80 is different to the angle of the tapered surfaces 94A of the lock members 90, when, as shown in FIG. 14C, the R portion 95, which is the upper end portion of the tapered surfaces 94A of the lock members 90, reach the upper end portion 87 of the tapered surfaces 86A of the brake member 80, the R portion 95 of the tapered surfaces 94A of the lock members 90 then contacts the tapered surfaces 86A of the brake member 80, as shown in FIG. 14D.

Figure 14E:
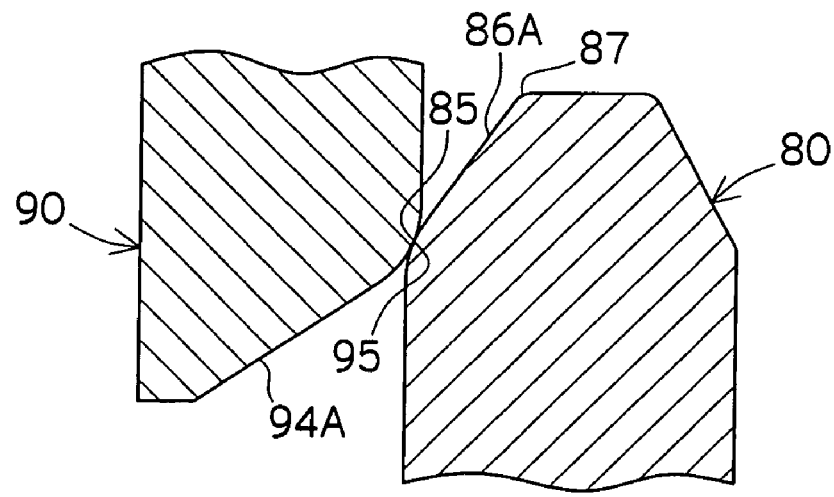
FIG. 14E is a sectional view showing a state where an end of a tapered surface of the brake member is contacting against an end of a tapered surface of the lock member.
Figure 14F:
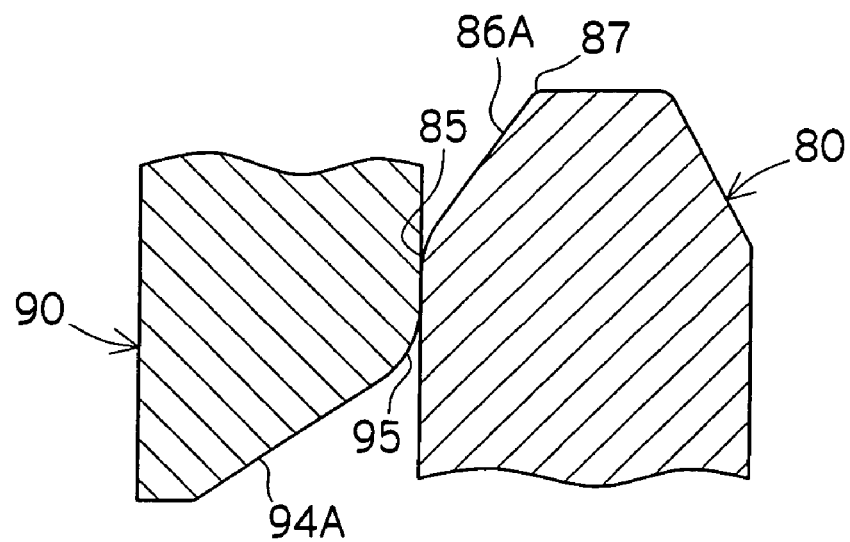
FIG. 14F is a sectional view showing a state after the lock member has slipped down from a tapered surface of the brake member.

Then, as shown in FIG. 14E, after the R portion 95 of the tapered surfaces 94A reaches the R portion 85, which is the lower end portion of the tapered surfaces 86A, the lock members 90 slip down from the brake member 80, as shown in FIG. 14F.

In this way, by changing the position of contact between the lock members 90 and the brake member 80 due to the movement of the lock members 90, changes in the resistance to sliding of the lock members 90 between the beginning of movement of the lock members 90 to just before they slip down from the brake member 80 are minimized.

Further, by forming the R portion 85 at the lower end portion (at the corner portion side where the lock members 90 slide down) of the tapered surfaces 86A of the brake member 80, and forming the R portion 95 at the upper end portion of the tapered surface 94A, the impact to the brake member 80 received when the lock members 90 slide down from the tapered surfaces 86A of the brake member 90 is made small and, at the same time, abrasion of the corner portions of the brake member 80 is prevented due to the fact that the lock members 90 slide down.

The lock members 90 can be formed from polyacetal (POM) or polyamide (PA, also known as nylon), and the brake member 80 can be formed from polyacetal. The polyacetal and nylon are materials with high lubricity, and forming the brake member 80 and the lock members 90 with high lubricity materials itself enables reduction of the resistance to sliding between the brake member 80 and the lock members 90.

Resistance to sliding can be further reduced by adding polyethylene (PE) or polytetrafluoroethylene (PTFE, also known as Teflon (registered trademark)) to polyacetal in an amount of 5-20 weight %. In addition, since nylon has a higher hardness than polyacetal, abrasion of the lock members 90 can be reduced by making the hardness of the lock members 90, which are the sliding members, higher than the hardness of the upper casing 14 and the brake member 80.

Further, in the present embodiment, as shown in FIGS. 9, 14A and 14B, the tapered surfaces 94A are formed at the cam portion 94 side of the lock members 90 with a gentler gradient than the tapered surfaces 86A of the brake member 80, and the upper end portion 87 of the tapered surfaces 86A contacts the tapered surfaces 94A of the lock members 90. However, the tapered surfaces 94A of the lock members 90 may be formed with a steeper gradient than the tapered surfaces 86A of the brake member 80 such that the tapered surfaces 86A contact the lower end portion 97 of the tapered surfaces 94A.

Figure 15A:
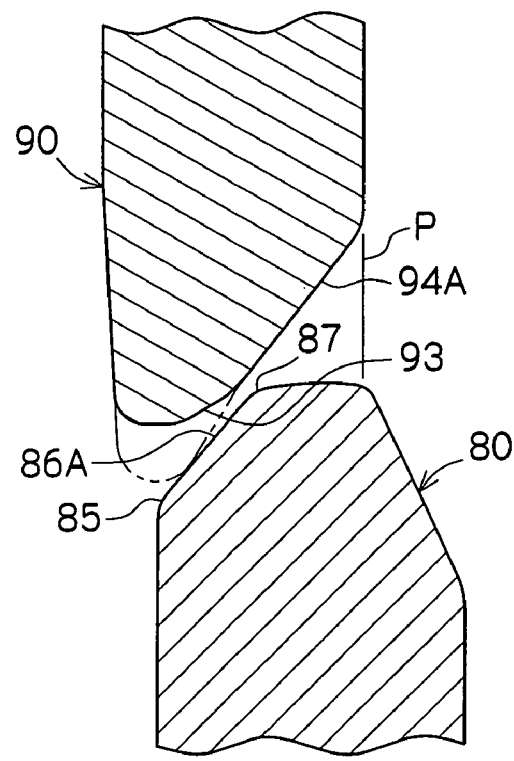
FIG. 15A is a sectional view showing an alternative example of a lock member and a state before a brake member contacts with the lock member.

As shown in FIG. 15A, the gradient of the tapered surfaces 94A of the lock members 90 may be tightened to, specifically, less than 45° relative to reference line P. Further, in certain embodiments the angle is 35° or less, and here it is approximately 33.5°, relative to reference line P.

Figure 15B:
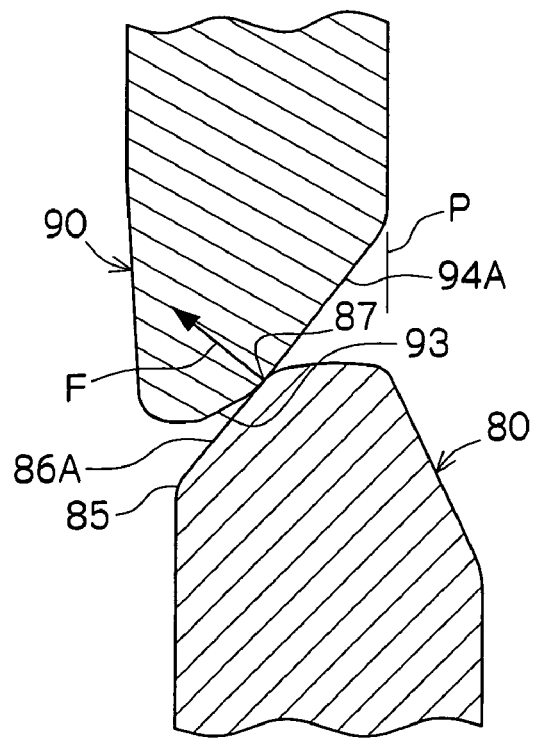
FIG. 15B is a sectional view showing a state where an end portion of a tapered surface of the brake member is contacting against a tapered surface of the lock member.

As shown in FIG. 15B, the upper end portion 87 of the tapered surface 86A of the brake member 80 contacts the tapered surface 94A of the lock member 90 (described below) and presses against the lock member 90 along reference line P. However, since the tapered surface 94A is formed at an angle relative to reference line P, the pressing force F against the lock member 90 is divided into a vertical direction component force (a pressing force whereby the lock member 90 presses against the top plate 14A of the upper casing 14 (refer to FIG. 10) in a vertical direction) and a horizontal direction component force (a sliding impelling force whereby the lock member 90 slides along the top plate 14A of the upper casing 14).

Figure 16A:
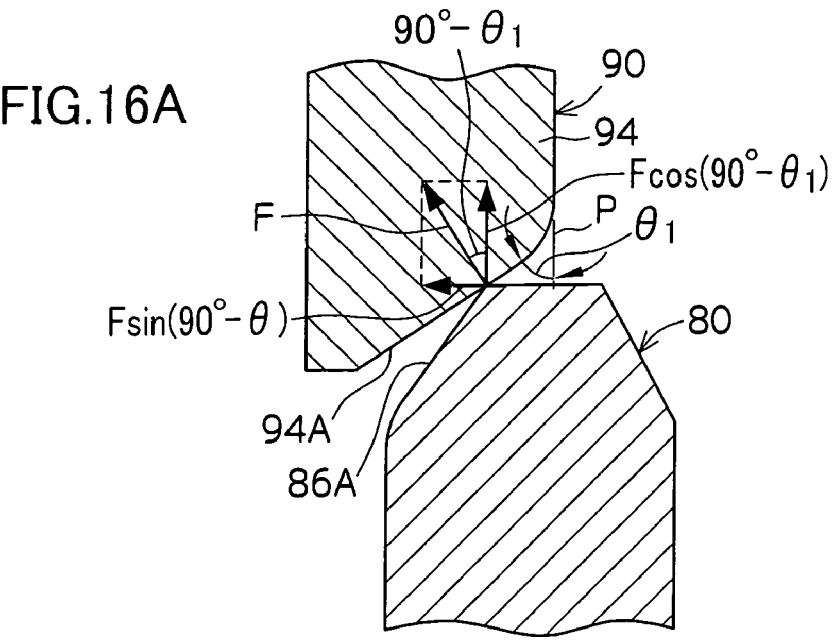
FIGS. 16A and 16B are explanatory diagrams showing a comparison of force components according to a difference in the angle of the tapered surface of a lock member.
Figure 16B:
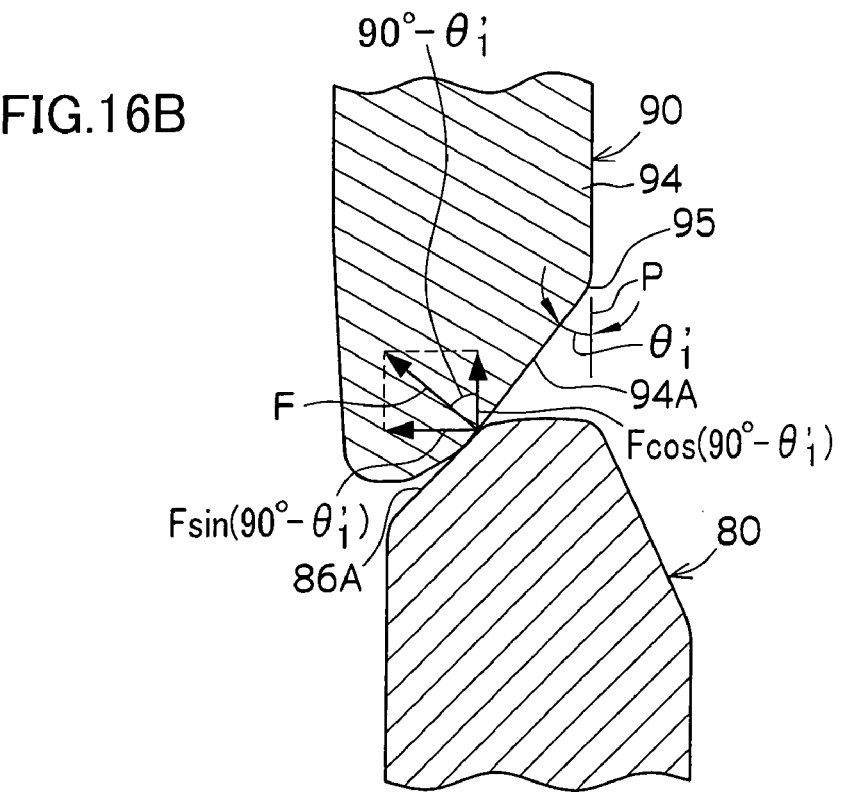

For example, as shown in FIG. 16A, the angle formed by the reference line P and the tapered surface 94A of the lock member 90 is $\theta_1$ and, as shown in FIG. 16B, the angle formed by the reference line P and the tapered surface 94A of the lock member 90 is $\theta_1'$ ($\theta_1 > \theta_1'$).

When the angle formed by the reference line P and the tapered surface 94A of the lock member 90 is $\theta_1$, the vertical direction component force against the lock member 90 is $F \cos(90° - \theta_1)$ and the horizontal direction component force against the lock member 90 is $F \sin(90° - \theta_1)$.

Further, when the angle formed by the reference line P and the tapered surface 94A of the lock member 90 is $\theta_1'$, the vertical direction component force against the lock member 90 is $F\cos(90°-\theta_1')$ and the horizontal direction component force against the lock member 90 is $F\sin(90°-\theta_1')$.

Here, because $\theta_1 > \theta_1'$, $F\cos(90°-\theta_1) > F\cos(90°-\theta_1')$ and $F\sin(90°-\theta_1')$.

In other words, by making the angle $\theta_1'$ formed by the reference line P and the tapered surface 94A of the lock member 90 a steep gradient, the pressing force against the lock members 90 acting in a vertical direction with respect to the sliding surface between the lock members 90 and the top plate 14A of the upper casing 14 can be reduced and the sliding impelling force of the lock members 90 acting in a horizontal direction along the sliding surface between the lock members 90 and the top plate 14A of the upper casing 14 can be increased.

As a result, resistance to sliding of the lock members 90 can be reduced, as can abrasion due to sliding. Thus, smooth movement of the lock members 90 can be obtained, an increase in the resistance to sliding due to abrasion can be prevented, and an increase in the releasing force required to release the reel 40 from a state of non-use can be avoided.

Figure 13:
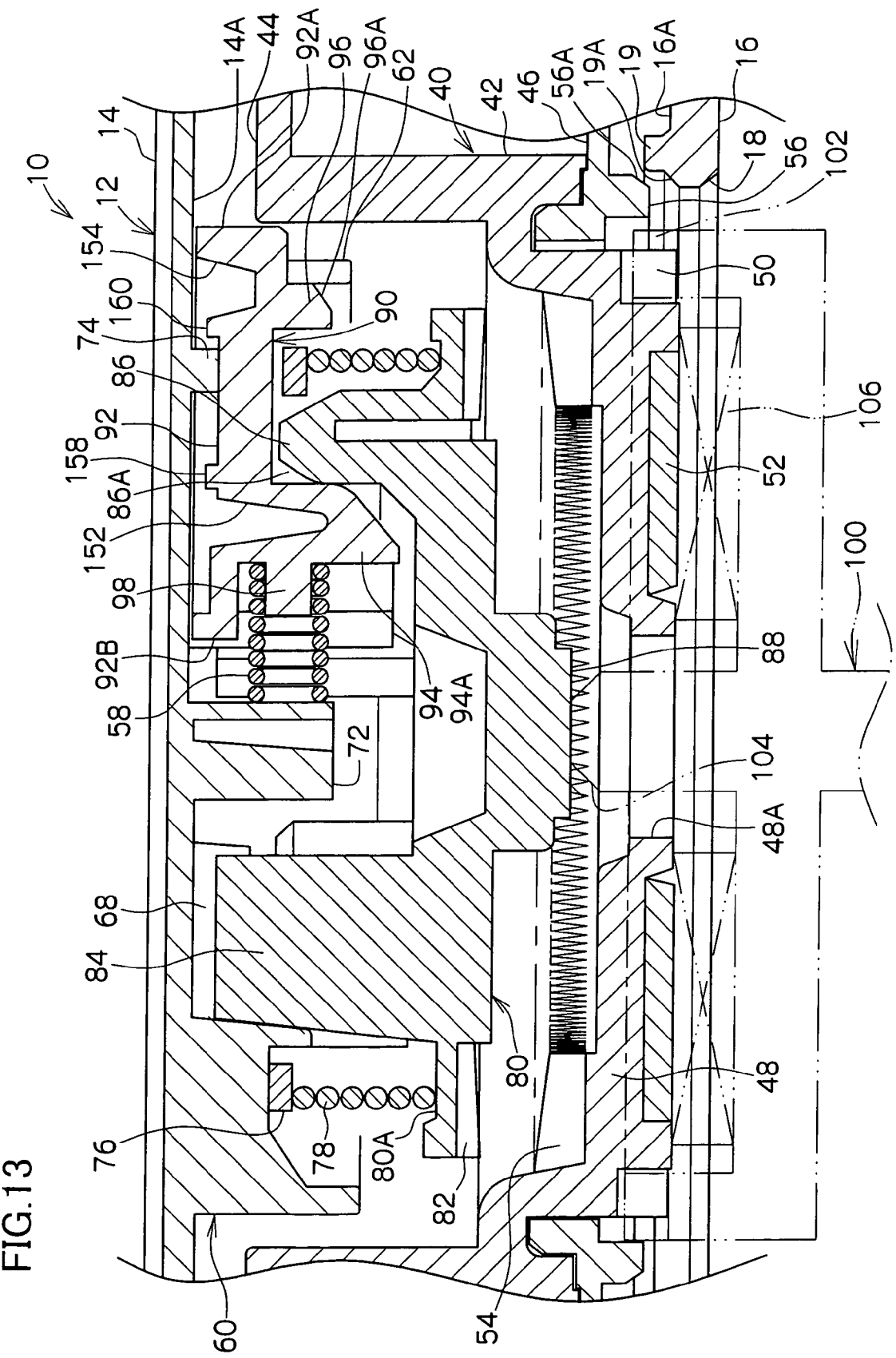
FIG. 13 is a partial enlarged schematic sectional side view of a recording tape cartridge after a rotation shaft is raised.

In this way, by giving the tapered surface 94A of the lock members 90 as steep a gradient as possible it is possible to obtain smooth movement of the lock members 90. However, as shown in FIGS. 13 and 15F, it is necessary to ensure that when the brake member 80 is moved upward, the pressing force (biasing force) whereby the lock members 90 are pressed by the coil springs 58 is absorbed by the inner side surfaces of the engagement projections 86 without generating a component force that pushes the brake member 80 in a downward direction, by having the outer side surfaces of the cam portions 94 to be contacted against the inner side surfaces of the engagement projections 86.

In other words, since the outer side surfaces of the cam portions 94 must be contacted against the inner side surfaces of the engagement projections 86 when the brake member 80 is moved upward, there is a limit to the position of the R portion 95 of the lock members 90 in a height direction in that it cannot be disposed too high.

Further, when the tapered surface 94A of the lock members 90 is given a steep gradient, the length to the distal end portion of the cam portions 94 is increased such that the brake member 80 comes to be positioned lower and the thickness of the recording tape cartridge 10 in an upward-downward direction (an axial direction of the reel 40) is increased.

For this reason, when the tapered surface 94A of the lock members 90 is given a steep gradient without changing the length of the cam portions 94, there is a risk that the distal end portion of the cam portions 94 will contact the brake member 80 (the broken line shown in FIG. 15A) when the recording tape cartridge 10 is not in use and interfere with the brake member 80.

Consequently, providing a gently inclined surface 93 (incline $S_3$; here, at an angle of approximately 65° to the reference line P, but it suffices that interference with the brake member 80 is avoided) at the corner portion (the lower end portion of the tapered surface 94A) side of the lock members 90 at the side of the lock members 90 that begins to slide enables the tapered surface 94A to stay clear of the brake member 80 such that interference between the lock members 90 and the brake member 80 can be avoided.

Figure 15C:
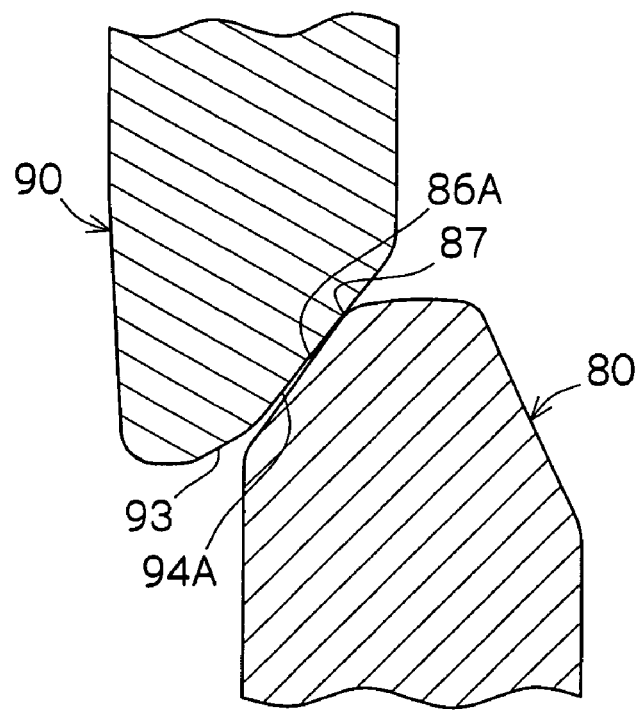
FIG. 15C is a sectional view showing a state where an end portion of a tapered surface of the brake member is contacting against a tapered surface of the lock member.
Figure 15D:
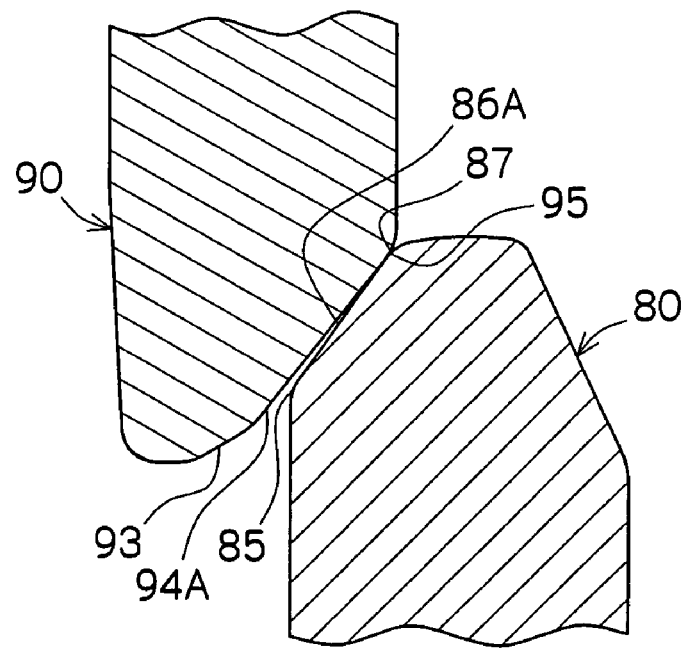
FIG. 15D is a sectional view showing a state where an end portion of a tapered surface of the brake member is contacting against an end portion of a tapered surface of the lock member.
Figure 15E:
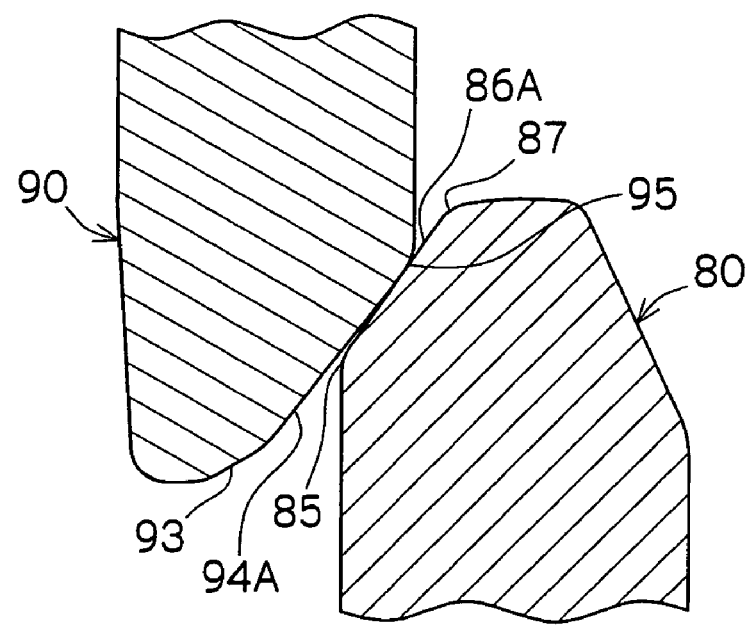
FIG. 15E is a sectional view showing a state where a tapered surface of the brake member is contacting against an end portion of a tapered surface of the lock member.
Figure 15F:
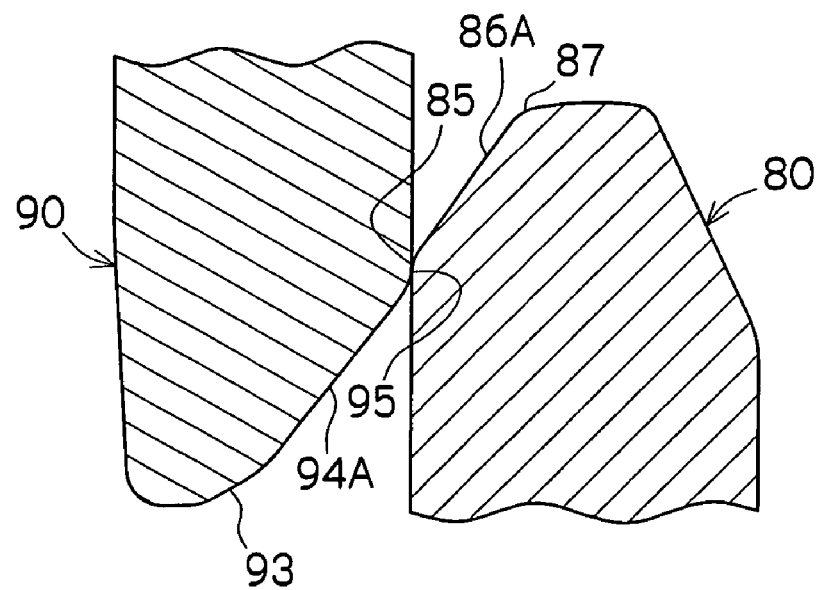
FIG. 15F is a sectional view showing a state after the lock member has slipped down from a tapered surface of the brake member.

Further, here, since the upper end portion 87 of the tapered surface 86A of the brake member 80 contacts the tapered surface 94A of the lock members 90, in order to avoid interference between the tapered surface 86A of the brake member 80 and the tapered surface 94A of the lock members 90, it is necessary to give the tapered surface 86A of the brake member 80 a steeper gradient than the tapered surface 94A of the lock members 90, as shown in FIGS. 15C to 15E.

Figure 18A:
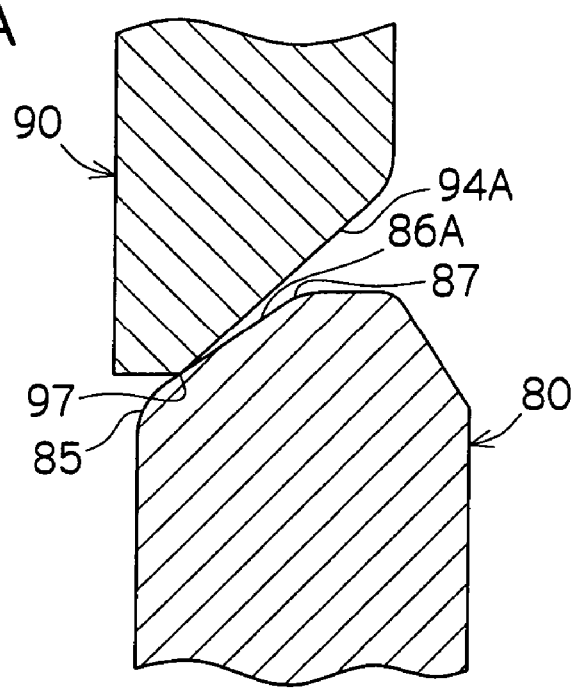
FIGS. 18A and 18B are alternative examples of lock members and brake members.
Figure 18B:
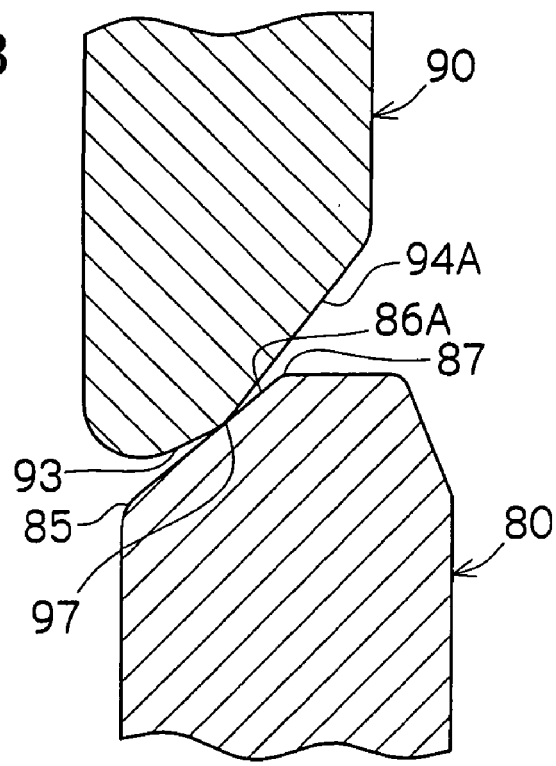
Figure 19:
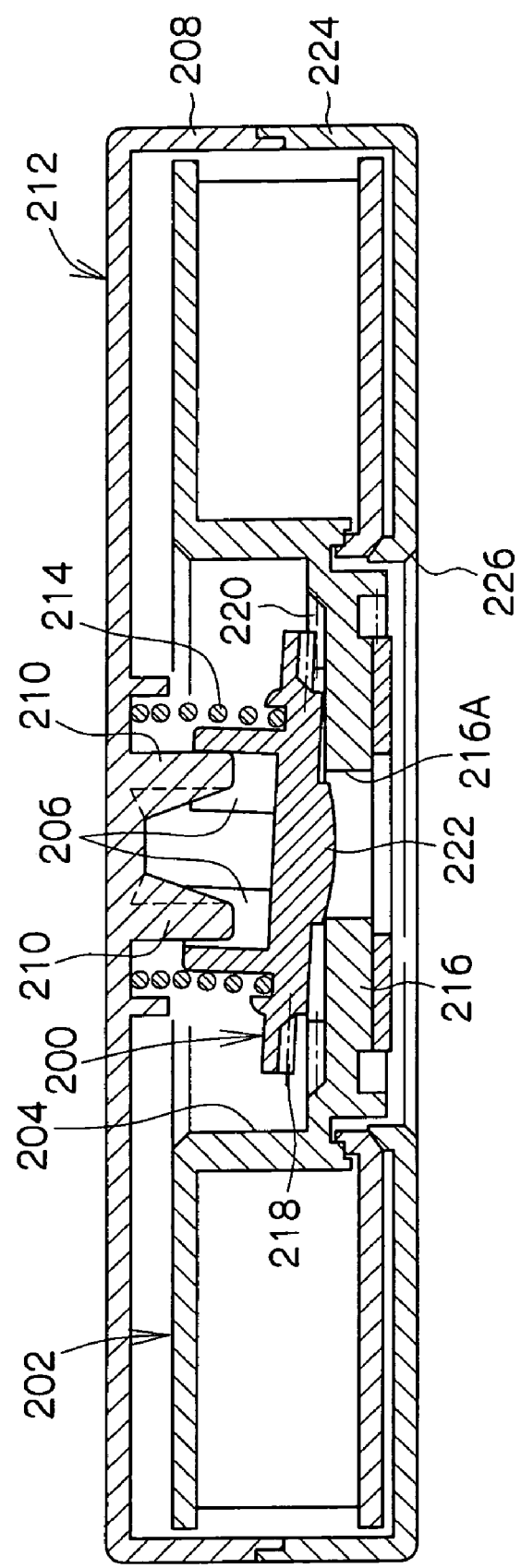
FIG. 19 is a schematic sectional side view of a conventional recording tape cartridge.

Further, when, as shown in FIG. 18B, the tapered surface 86A of the brake member 80 is formed so as to contact the lower end portion 97 of the tapered surface 94A, the tapered surface 86A of the brake member 80 has a gentler gradient than the tapered surface 94A of the lock members 90.

Figure 17A:
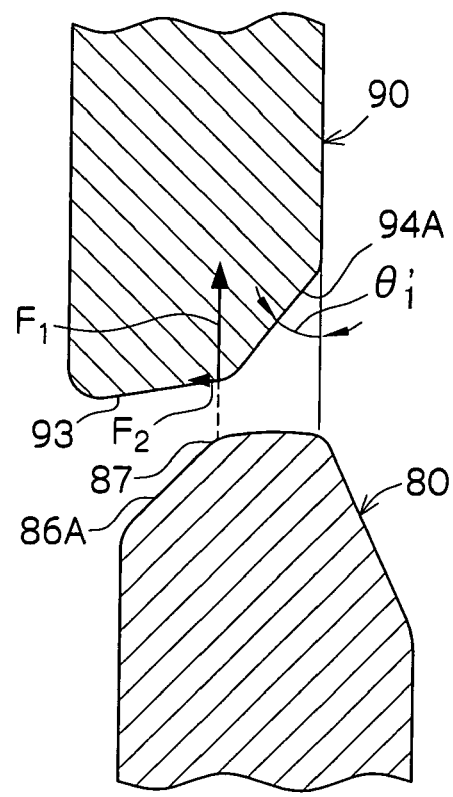
FIGS. 17A and 17B are explanatory diagrams showing a comparison of force components according to a difference in the position where a brake member contacts a lock member.

When the tapered surface 94A of the lock members 90 is given the steepest possible gradient, there is a risk that the upper end portion 87 of the tapered surface 86A of the brake member 80 will contact with the gently inclined surface 93, as shown in FIG. 17A.

In this case, the pressing force $F_1$ (which is larger than $F_1'$ shown in FIG. 17B) by which the lock members 90 press against the top plate 14A of the upper casing 14 in a vertical direction becomes larger, and the sliding impelling force $F_2$ (which is smaller than $F_2'$ shown in FIG. 17B) acting along the sliding surface between the lock members 90 and the top plate 14A of the upper casing 14 becomes smaller.

Figure 17B:
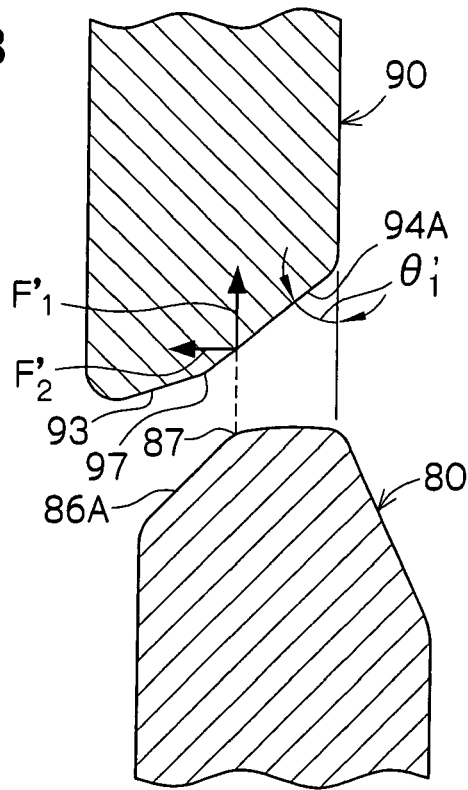

For this reason, the upper end portion 87 of the tapered surface 86A of the brake member 80 is made to reliably contact the tapered surface 94A (including the lower end portion 97 of the tapered surface 94A), rather than the gently inclined surface 93, of the lock members 90, as shown in FIGS. 15B and 17B.

Then, as shown in FIG. 15C, the tapered surface 94A of the lock members 90 moves over the upper end portion 87 of the tapered surface 86A of the brake member 80 and when, as shown in FIG. 15D, the upper end portion 87 of the tapered surface 86A of the brake member 80 reaches the R portion 95, which is the upper end portion of the tapered surface 94A of the lock members 90, the R portion 95 of the tapered surface 94A of the lock members 90 then contacts the tapered surface 86A of the brake member 80 as shown in FIG. 15E.

Next, after the R portion 95 of the tapered surface 94A has reached the R portion 85, which is the lower end portion of the tapered surface 86A, the lock members 90 slip down from the brake member 80, as shown in FIG. 15F.

Incidentally, it is preferable to have at least one of the lock members 90 disposed, as shown in FIGS. 2 and 3, at an upper side in a vertical direction (with arrow C indicating a vertically downward direction) when the recording tape cartridge 10 is loaded into a drive device that has been placed on its side. Such a structure enables optimal prevention of displacement (off-center with respect to the rotary shaft 100) of the reel 40 downward in a vertical direction (the direction of arrow C) due to its own weight.

Further, the lock member 90 should be structured so that it is completely withdrawn from between the upper surface of the upper flange 44 and the inner surface of the top plate 14A when the reel gear 50 and the drive gear 102 have meshed to about substantially half the height of the gear teeth, or thereafter. Accordingly, the lock members 90 may be structured so that they can be withdrawn while allowing the reel 40 to move upward by, for example, forming a tapered surface at a predetermined angle facing outward from a predetermined position in the lower surface of the outer side end portion 92A of the lock members 90.

Further, in the above embodiment, the coil springs 58 have been explained as the biasing device urging the lock members 90 toward an outer side in a radial direction from the center of the reel 40 (the mounting portion 60); however, the biasing device is not limited to this and, for example, the invention may be structured with blade springs or torsional springs. Further, it is preferable that the structure is such that this kind of biasing device is disposed at the substantially center (central of the mounting portion 60) portion of the inner surface of the top plate 14A since this achieves effective use of dead space inside the case 12 and enables the biasing device to have a compact structure.

In addition, although the above-mentioned embodiment is structured so that the lock member 90 is caused to slide in a radial direction due to engagement with the brake member 80, the structure for causing the lock member 90 to slide in a radial direction is not limited thereto. It is also possible, for example, that in addition to the brake member 80, a switching member or the like may be provided, which switches the lock member 90 between an up-down movement locking position (a position for preventing the reel 40 from moving in an axial direction) and an up-down movement permitting position (a position for permitting the reel 40 to move in an axial direction). However, in this case, it is preferable that the switching member or the like be arranged such that it is operated in interlocking relationship with the brake member 80.

Further, in the present invention, in the process whereby the lock members are pushed by the brake member to disengage from the reel, the incline $S_2$ of the lock members may first contact the end portion of the incline $S_1$ of the brake member.

Here, the end portion of the incline $S_1$ refers to the corner portion (including the R portion), being the position where the incline $S_1$ and a separate straight line or the like intersect. Then, when one of the end portions of the incline $S_1$ is designated the initial end portion and the other the final end portion, there is a case when the incline $S_2$ of the lock members first contacts the initial end portion of the incline $S_1$ of the brake member, and a case when the incline $S_2$ of the lock members first contacts the final end portion of the incline $S_1$ of the brake member, in the process whereby the lock members are pushed by the brake member to disengage from the reel.

In the present invention, in the process whereby the lock members are pushed by the brake member to disengage from the reel, the end portion of the incline $S_2$ of the lock members may first contact the incline $S_1$ of the brake member.

Here, the end portion of the incline $S_2$ refers to the corner portion (including the R portion), being the position where the incline $S_2$ and a separate straight line or the like intersect. Then, when one of the end portions of the incline $S_2$ is designated the initial end portion and the other the final end portion, there is a case when the initial end portion of the incline $S_2$ of the lock members first contacts the incline $S_1$ of the brake member, and a case when the final end portion of the incline $S_2$ of the lock members first contacts the incline $S_1$ of the brake member, in the process whereby the lock members are pushed by the brake member to disengage from the reel.

In the present invention, an R portion may be formed at an end portion of the incline $S_1$ of the brake member on the side at which the lock members slip down.

With this structure, by forming an R portion at an end portion (the corner portion) of the incline $S_1$ of the brake member on the side at which the lock members slip down, the impact to the brake member received when the lock members side down from the inclined surface of the brake member is made smaller. Further, by forming an R portion at a corner portion of the brake member, abrasion of the corner portion due to the lock members slipping down is prevented.

In the present invention, the incline $S_2$ of the lock members may have a steep gradient of less than 45° with respect to a reference line along an axial direction of the reel hub.

With this structure, by giving the incline $S_2$ of the lock members a steep gradient of less than 45° with respect to the reference line, the component force in a vertical direction (the pressing force that presses the case via the lock members along a vertical direction) against the case due to the pressing force of the brake member can be reduced as compared to when the incline $S_2$ of the lock members is given a gentle gradient. Further, the component force in a horizontal direction (the sliding impelling force acting on the lock members in a horizontal direction along the sliding surface between the lock members and the case) against the case due to the pressing force of the brake member can be enlarged.

In other words, it is possible to reduce resistance to sliding between the lock members and the case, and also to reduce abrasion of the lock members and the case.

In the present invention, an incline $S_3$ may be provided at a corner portion of the lock members on the side the lock members begin to slide, which avoids interference with the brake member.

When the incline $S_2$ of the lock members is given a steep gradient, there is a risk that the distal end portions of the lock members will contact the brake member when the recording tape cartridge is not in use and interfere with the brake member. For this reason, providing an incline $S_3$, which avoids interference with the brake member, at a corner portion of the lock members on the side the lock members begin to slide ensures that there is no interference between the lock members and the brake member.

In the present invention, in the process whereby the lock members are pushed by the brake member to disengage from the reel, the incline $S_2$ of the lock members may first contact the end portion of the incline $S_1$ of the brake member.

Since the incline $S_3$ is formed with the object of avoiding interference with the brake member, it is formed with a gentle gradient. If the incline $S_2$ of the lock members which contacts the incline $S_1$ of the brake member has a steep gradient, resistance to sliding between the case and the lock members can be reduced, as can abrasion of the case and the lock members.

For this reason, in the process whereby the lock members are pushed by the brake member to disengage from the reel, the end portion of the incline $S_1$ of the brake member is made to contact reliably against the incline $S_2$ rather than against the incline $S_3$.

In the present invention, in the process whereby the lock members are pushed by the brake member to disengage from the reel, the end portion of the incline $S_2$ of the lock members may first contact the incline $S_1$ of the brake member.

With this structure, in the process whereby the lock members are pushed by the brake member to disengage from the reel, there is a case when the end portion of the incline $S_2$ of the lock members is first contacted against the incline $S_1$ of the brake member, by which it is possible to obtain the same effects as with the structure described above.

In the present invention, the brake member may be formed of polyacetal and the lock members may be formed of polyacetal or polyamide.

With this structure, the brake member is formed of polyacetal (POM) and the lock members are formed of polyacetal or polyamide (PA, also known as nylon). Since polyacetal and nylon are highly lubricative materials, resistance to sliding between the brake member and the lock members can thereby be reduced. Further, since nylon has higher hardness than polyacetal abrasion of the lock members, which are the sliding members, can be reduced by making the lock members harder than the brake member.

In the present invention, polyethylene or polytetrafluoroethylene may be added to the polyacetal in an amount of 5-20% weight percent.

In such a case, adding polyethylene (PE) or polytetrafluoroethylene (PTFE, also known as Teflon (registered trademark)) to the polyacetal in an amount of 5-20% weight percent enables further reduction of the abrasion coefficient.

The present invention, having the above structure, enables prevention of movement of the reel in an axial direction when the recording tape cartridge is not in use by providing lock members that regulate movement of the reel in an axial direction when the brake member and the engagement portion are engaged with each other as is the case when the recording tape cartridge is not in use. Further, abrasion due to sliding of the lock members is reduced, an increase in resistance to sliding due to abrasion is prevented, and an increase in the releasing power required to release the reel from a state of non-use is prevented.

What is claimed is:

1. A recording tape cartridge comprising:
  an engagement portion formed at a lower wall of a hub of a reel rotatably accommodated within a case around which a recording tape is wound;
  a brake member facing the engagement portion and provided so as to be movable along an axial direction of the hub, which engages with the engagement portion and controls rotation of the reel, releasing the engagement portion from an engaged state to allow rotation of the reel;
  a parts mounting portion formed at a central portion of the case and positioned further at an inner side than the hub;
  a lock member mounted at the parts mounting portion so as to be movable in a radial direction of the reel, which intervenes between the reel and the case and controls movement of the reel in a radial direction and an axial direction, and which is pushed by the brake member to disengage from the reel and allow movement of the reel; and
  a biasing device that urges the lock member in a radial direction of the reel, wherein
  the brake member and the lock member respectively have inclines $S_1$, $S_2$ with mutually different angles, and the incline $S_1$ of the brake member and the incline $S_2$ of the lock member contact each other.

2. The recording tape cartridge of claim 1 wherein, in a process in which the lock member is pushed by the brake member to disengage from the reel, an end portion of the incline $S_2$ of the lock member first contacts the incline $S_1$ of the brake member.

3. The recording tape cartridge of claim 1, comprising an R portion formed at an end portion of the incline $S_1$ of the brake member at a side where the lock member slides down.

4. The recording tape cartridge of claim 1 wherein the incline $S_2$ of the lock member has a steep gradient of less than 45° with respect to a reference line along an axial direction of the hub.

5. The recording tape cartridge of claim 4, comprising an incline $S_3$ that avoids interference with the brake member provided at a corner portion of the lock member at a side where the lock member begins to slide.

6. The recording tape cartridge of claim 5 wherein, in a process in which the lock member is pushed by the brake member to disengage from the reel, an end portion of the incline $S_2$ of the lock member first contacts the incline $S_1$ of the brake member.

7. The recording tape cartridge of claim 4 wherein, in a process in which the lock member is pushed by the brake member to disengage from the reel, the incline $S_2$ of the lock member first contacts an end portion of the incline $S_1$ of the brake member.

8. The recording tape cartridge of claim 1 wherein the brake member is formed of polyacetal and the lock member is formed of polyacetal or polyamide.

9. The recording tape cartridge of claim 8 wherein polyethylene or polytetrafluoroethylene is added to the polyacetal in an amount of 5-20% weight percent.

10. The recording tape cartridge of claim 1 wherein the brake member is formed of polyacetal and the lock member is formed of polyacetal or polyamide.

11. The recording tape cartridge of claim 10, wherein polyethylene or polytetrafluoroethylene is added to the polyacetal in an amount of 5-20% weight percent.

12. A recording tape cartridge comprising:
  an engagement portion formed at a lower wall of a hub of a reel rotatably accommodated within a case around which a recording tape is wound;
  a brake member facing the engagement portion and provided so as to be movable along an axial direction of the hub, which engages with the engagement portion and controls rotation of the reel, releasing the engagement portion from an engaged state to allow rotation of the reel;
  a parts mounting portion formed at a central portion of the case and positioned further at an inner side than the hub;
  a lock member mounted at the parts mounting portion so as to be movable in a radial direction of the reel, which intervenes between the reel and the case and controls movement of the reel in a radial direction and an axial direction, and which is pushed by the brake member to disengage from the reel and allow movement of the reel; and
  a biasing device that urges the lock member in a radial direction of the reel, wherein
  the brake member and the lock member respectively have inclines $S_1$, $S_2$ with mutually different angles, and when the lock member moves, an end portion of one incline of the inclines $S_1$, $S_2$ contacts another of the inclines $S_1$, $S_2$ and an end portion thereof.

13. The recording tape cartridge of claim 12 wherein, in a process in which the lock member is pushed by the brake member to disengage from the reel, the incline $S_2$ of the lock member first contacts an end portion of the incline $S_1$ of the brake member.

14. The recording tape cartridge of claim 12 wherein, in a process in which the lock member is pushed by the brake member to disengage from the reel, an end portion of the incline $S_2$ of the lock member first contacts the incline $S_1$ of the brake member.

15. The recording tape cartridge of claim 12, comprising an R portion formed at an end portion of the incline $S_1$ of the brake member at a side where the lock member slides down.

16. The recording tape cartridge of claim 12 wherein the incline $S_2$ of the lock member has a steep gradient of less than 45° with respect to a reference line along an axial direction of the hub.

17. The recording tape cartridge of claim 16, comprising an incline $S_3$ that avoids interference with the brake member provided at a corner portion of the lock member at a side where the lock member begins to slide.

18. The recording tape cartridge of claim 16 wherein, in a process in which the lock member is pushed by the brake member to disengage from the reel, the incline $S_2$ of the lock member first contacts an end portion of the incline $S_1$ of the brake member.

19. The recording tape cartridge of claim 16 wherein, in a process in which the lock member is pushed by the brake member to disengage from the reel, an end portion of the incline $S_2$ of the lock member first contacts the incline $S_1$ of the brake member.

* * * * *